US012290128B1

(12) United States Patent
Williams et al.

(10) Patent No.: US 12,290,128 B1
(45) Date of Patent: May 6, 2025

(54) HELMET AND SUIT APPARATUS

(71) Applicant: BULLDOG SAFETY SYSTEMS, LLC, Owensboro, KY (US)

(72) Inventors: Bram Williams, Owensboro, KY (US); Bradley Shoulders, Owensboro, KY (US)

(73) Assignee: BULLDOG SAFETY SYSTEMS, LLC, Owensboro, KY (US)

( * ) Notice: Subject to any disclaimer, the term of this patent is extended or adjusted under 35 U.S.C. 154(b) by 251 days.

(21) Appl. No.: 17/897,787

(22) Filed: Aug. 29, 2022

(51) Int. Cl.

| | |
|---|---|
| ***A42B 3/22*** | (2006.01) |
| ***A42B 3/04*** | (2006.01) |
| ***A42B 3/14*** | (2006.01) |
| ***A42B 3/28*** | (2006.01) |
| ***A42B 3/30*** | (2006.01) |
| *A62B 17/00* | (2006.01) |

(52) U.S. Cl.
CPC ............ *A42B 3/225* (2013.01); *A42B 3/0406* (2013.01); *A42B 3/147* (2013.01); *A42B 3/283* (2013.01); *A42B 3/30* (2013.01); *A62B 17/006* (2013.01)

(58) Field of Classification Search
CPC .. A42B 3/225; A42B 3/28; A42B 3/30; B63C 11/06; B63C 11/04; B63C 11/18; B63C 11/12; B63C 2011/128; A61F 9/02
See application file for complete search history.

(56) References Cited

U.S. PATENT DOCUMENTS

| | | | | | |
|---|---|---|---|---|---|
| 484,885 | A * | 10/1892 | Stove | B63C 11/04 | 2/2.15 |
| 3,680,556 | A * | 8/1972 | Morgan | B63C 11/06 | 128/201.15 |
| 3,958,275 | A * | 5/1976 | Morgan | B63C 11/06 | 128/201.27 |
| 3,968,794 | A * | 7/1976 | O'Neill | B63C 11/14 | 128/201.27 |
| 3,995,627 | A * | 12/1976 | O'Neill | B63C 11/06 | 128/201.15 |
| 4,015,294 | A * | 4/1977 | O'Neill | B63C 11/06 | 2/421 |

(Continued)

OTHER PUBLICATIONS

Kirby Morgan and Desco Commercial Diving Helmets; American Diving Supply; https://www.americandivingsupply.com/Commercial-Diving-Helmets-s/58.htm.

(Continued)

*Primary Examiner* — Jillian K Pierorazio
(74) *Attorney, Agent, or Firm* — Wyatt, Tarrant & Combs, LLP; Max E. Bridges

(57) ABSTRACT

A helmet and suit apparatus comprising a helmet with a lens that is connected to a yoke, a neck dam, or other garment via a seal ring assembly. In some embodiments, the apparatus has an air control system permitting air flow into and out of the helmet and for maintaining positive air pressure in the helmet. In further embodiments, the air control system has a series of passages and lens ports that permit air flow on to the inside surface of the lens for anti-fogging purposes, as well as a series of head ports for cooling the wearer's head. The apparatus further comprises a communication system, accessory rails for mounting equipment, and attachment points in the inside of the helmet for receiving hard hats and chin straps as needed.

18 Claims, 19 Drawing Sheets

(56) References Cited

U.S. PATENT DOCUMENTS

| | | | | | |
|---|---|---|---|---|---|
| 4,137,912 | A * | 2/1979 | O'Neill | B63C 11/18 | 128/201.27 |
| 4,211,220 | A * | 7/1980 | O'Neill | B63C 11/18 | 128/201.27 |
| 4,250,877 | A * | 2/1981 | Owens | B63C 11/16 | 128/203.29 |
| 5,022,100 | A * | 6/1991 | Belanger | H04R 1/1058 | 128/201.27 |
| 5,044,017 | A * | 9/1991 | Kirby | B63C 11/06 | 2/421 |
| 5,694,650 | A * | 12/1997 | Hong | A42B 3/28 | 2/435 |
| 2006/0286933 | A1* | 12/2006 | Harkins | H04W 84/10 | 455/41.2 |
| 2009/0172935 | A1* | 7/2009 | Anderson | B63C 11/06 | 29/700 |
| 2015/0284061 | A1* | 10/2015 | Anderson | B63C 11/14 | 405/186 |
| 2015/0366284 | A1* | 12/2015 | Dowling | A42B 3/08 | 2/10 |
| 2016/0008640 | A1* | 1/2016 | Teetzel | A42B 3/228 | 128/201.19 |
| 2019/0045866 | A1* | 2/2019 | Weller | A42B 3/042 | |
| 2020/0001123 | A1* | 1/2020 | Van | A62B 18/045 | |
| 2020/0113265 | A1* | 4/2020 | Gehring | F41H 1/04 | |
| 2022/0306253 | A1* | 9/2022 | Holopainen | B63C 11/12 | |

OTHER PUBLICATIONS

3M Reusable Respirators for Personal Safety—3M United States; 3M; https://www.3m.com/3M/en_US/p/c/ppe/respiratory-protection/reusable-respirators/i/safety/personal-safety/.

3M Scott AV-3000 HT Facepiece; 3M; https://www.3m.com/3M/en_US/p/d/b5005218022/.

Drager Safety Firefighting SCBA; Dragerwerk AG & Co. KgaA; https://www.draeger.com/en-us_us/Safety/Firefighting/SCBA.

Hazmat Suits—Biohazard and Radiation, Haz-Suit, Mira Safety; Mira Safety; https://www.mirasafety.com/products/mira-safety-haz-suit-hazmat-suit.

Hazmat Suits—Levels of Protection; Hazwoper Osha Training, LLC; https://hazwoper-osha.com/blog-post/hazmat-suits-levels-of-protection.

Personal Fall Protection Systems Fact Sheet; TDI, Safety @ Work; Division of Workers' Compensation; HS04-027C (12-21); pp. 1-7; https://www.tdi.texas.gov/pubs/videoresource/fsfallprotect.pdf.

Viking SL17K/27/KM37/47/57/77/97 Rubber Drysuit Yoke, for HD—Haztech Suits—DECA Diving; DECA Diving; https://decadiving.com/viking-sl17k-27-km37-47-57-77-97-rubber-drysuit-yoke-for-hd-haztech-suits/.

Viking HD Heavy Duty Vulcanized Rubber Drysuit with SuperLite 27/17K/37/47/57/67/77 Yoke—Dive Commercial International; Dive Commercial International; https://www.divecommercial.com/brands/viking-hd-heavy-duty-vulcanized-rubber-drysuit-superlite-27-17k-37-47-57-67-77-yoke/.

Kirby Morgan Neoprene Neck Dam For SuperLite SL 27 Diving Helmet; American Diving Supply; https://www.americandivingsupply.com/Kirby-Morgan-Neoprene-Neck-Dam-SuperLite-SL-27-p/510-687.htm.

Viking SL17 Drysuit Yoke with Neckseal for HD—Haztech Suits; Amron International, Inc.; https://www.amronintl.com/viking-superlite-17-yoke-with-neckseal.html.

* cited by examiner

HELMET AND SUIT APPARATUS

FIELD OF INVENTION

The embodiments described herein relate to a helmet and suit apparatus for use as personal protective equipment, as well as other uses and advantages disclosed herein.

BACKGROUND

Personal protective equipment ("PPE") refers to any type of protective clothing, helmets, goggles, and equipment which protect a wearer's body from injury, infection, and other hazards. For example, a hazardous materials suit (often referred to as a "hazmat suit") is a type of PPE which typically consists of an impermeable garment worn to protect people (also referred to as "worker(s)" or "wearer(s)" herein) from hazardous materials or substances, such as chemicals, biological agents, or radioactive materials. A hazmat suit must fully and totally encapsulate the worker, leaving no avenues for harmful substances to enter the suit.

In addition, a self-contained breathing apparatus ("SCBA") is often combined with the suit to provide a supply of breathable air. Depending on the situation, the worker may also need protection from falling. The U.S. Occupational Safety and Health Administration refers to this as a personal fall arrest system ("PFAS"), which typically consists of a body harness, an anchorage and a connector, such as a lanyard, deceleration device, lifeline, or a combination thereof. When working in certain hazardous situations and enclosed environments, there may also be a need to fit the worker with a hard hat, communications hardware, lighting and camera systems, and other equipment known to one of ordinary skill in the art.

However, the conventional PPE systems do not provide adequate protection or functionality. Moreover, there is no available system that provides total encapsulation of workers in harsh environments for extended periods of time while also providing the required protections. In order to match the required PPE with the type of hazard, the conventional approach requires a combination of different systems which are not designed to work together. For example, the combined system may consist of a SCBA, hard hat, hazmat suit, fall protection (or PFAS), communications hardware, and lighting and camera systems. However, this conventional approach has many challenges because it typically leaves the worker with ill-fitting, poorly functioning, cumbersome, and movement-restricting equipment with poor visibility. In addition, the conventional PPE systems often create new hazards or cannot be properly applied rendering them ineffective.

For example, conventional SCBA systems require air tanks that are often fitted by straps onto the worker's back. However, these air tanks limit the worker's ability to maneuver in confined spaces (e.g. performing work while lying on one's back or in a seated positioned). In addition, because of the small volume of air contained within the tank, the conventional SCBA system limits the available time for work to an average of thirty minutes or less. Beyond limiting the time, the limited air supply causes other performance issues. For instance, low flow demand-pressure regulators are often used to conserve tank air, but this makes it difficult to breath when performing laborious tasks.

Conventional PPE and SCBA systems also commonly suffer from fogging of the lens and poor visibility. This problem has become such an issue that conventional SCBA systems sometimes include wiper blades positioned on the inside of the mask. However, these wipers are typically controlled by manually turning a knob on the front of the mask and this is a difficult task, especially when the worker is performing work and wearing large gloves.

To ensure the SCBA mask properly seals around the worker's face, elastic straps must be worn over and around the worker's head. However, the straps must be adjusted very tightly around the worker's head which is often uncomfortable and sometimes painful. Furthermore, the straps make it nearly impossible to wear a hard hat in confined spaces or when performing physical work. Also, the conventional SCBA face mask and straps leave the worker's head, ears, and neck exposed to hazardous elements. Accordingly, conventional SCBA systems require the addition of head and neck protection when working in such a hazardous environment.

When head and neck exposure is not permissible, workers are required to wear a total encapsulation suit which typically comprises a very large garment that includes an oversized head containment bubble with a clear viewport for visibility. The garment is also typically sized to be worn over a SCBA system. However, this conventional arrangement presents a number of disadvantages. In particular, while wearing the total encapsulation suit over a SCBA, the worker's exhaled breath blows directly on to the viewport of the suit, thereby causing the viewport of both the suit and the SCBA lens to fog, thus limiting visibility. Furthermore, it is difficult to see through both the viewport lens of the SCBA and the encapsulation suit because of distorted visual effects, creating further difficulties for workers performing tasks that require fine detail. A full encapsulation suit is also typically very hot and does not cool the body or the head of the worker during use in hot temperatures.

Most SCBA and encapsulation suits are not equipped with two-way communication systems, thus requiring the worker to wear a separate communication system. But these conventional communication systems are not designed to work with hard hats and encapsulation suits. For example, the traditional communication systems are generally wireless and require batteries, which are prone to failure and time limitations. Also, the conventional communication systems often only transmit when the worker presses a transmit button which is typically mounted on the SCBA face plate. However, it is very difficult for a worker to press the transmit button while wearing a full encapsulation suit. Likewise, when fall protection is required, the typical harness cannot be fitted over the SCBA air tank or over the encapsulation suit, which exposes the worker to potential hazards. The conventional PPE systems also do not provide easy mounting surfaces for lights, cameras, and other equipment, thereby leaving workers with only handheld flashlights and other equipment which is not effective when performing tasks that require both hands.

While some conventional approaches have used an underwater diving system as a full encapsulation system, this approach requires an extremely heavy helmet often weighing twenty or more pounds. But a diving helmet is inordinately heavy when not being used underwater (i.e. topside), bulky, and not easy to use.

Accordingly, there is a significant need for a PPE system which fully encapsulates workers for extended periods of time while meeting all the required protections. In addition, there is a significant need for a system which easily permits the use of hard hats, communication systems, and fall protection (or PFAS). There is also a need for a PPE system with improved visibility and which permits light and camera systems to be easily mounted. Along with other features and advantages outlined herein, the helmet and suit apparatus within the scope of present embodiments meet these and other needs. In doing so, the helmet and suit apparatus is easier to use, better fitting, light-weight, provides easy maneuverability and better communications, and improved visibility.

SUMMARY OF EMBODIMENTS

According to multiple embodiments and alternatives, the helmet and suit apparatus comprises a helmet connected to a suit, along with connections for hard hats, chin straps, and communication systems, and accessory rails for mounting additional equipment as needed. In some embodiments, the helmet is connected to the suit via a seal ring assembly that attaches to the suit yoke and completes a seal that provides total encapsulation from hazardous elements. The seal ring assembly may also attach to a neck dam, or any type of garment that needs to be secured as known to one of ordinary skill in the art. A wide and curved lens is connected to the front of the helmet by a bezel. In some embodiments, the lens comprises a polycarbonate material which is shatter-proof and can withstand high impacts (e.g. lexan as a non-limiting example). In further embodiments, the helmet is made of a reinforced thermoplastic polymer (such as acrylonitrile butadiene styrene), carbon fiber, polycarbonate, nylon, ULTEM™ resin and combinations thereof as non-limiting examples. The helmet materials could be reinforced with carbon fiber or glass at varying percentages and lengths, along with an epoxy base and an enamel coat, as non-limiting examples.

The helmet and suit apparatus further comprise an air pressure system having an air control inlet, a series of air passages and ports for distributing air throughout the helmet (as well as keeping the lens clear of fog and cooling the wearer's head), and an air exhaust valve. In some embodiments, anti-fogging viewport lens ports are located and aligned near the lens to provide constant air flow to the inner side of the viewport lens. The ports also increase in size as the distance from the air inlet increases, thereby providing even air flow over the entire inner side of the lens to reduce and eliminate fog. According to multiple embodiments and alternatives, the air exhaust valve comprises an umbrella valve to provide backflow prevention (i.e. one way air flow), and a pressure plate and lightweight spring which apply a light closing pressure on the umbrella valve, thereby creating positive pressure within the helmet. Upon passing through the umbrella valve and overcoming the opposing force applied by the pressure plate and spring, air passes through a labyrinth exhaust feature which prevents debris from entering into the exhaust valve and prevents failure of the umbrella valve.

In some embodiments, the helmet is hard-wired for a communication system (e.g. a two-way open microphone communication as non-limiting example). To accommodate the communication system, the helmet defines a microphone protrusion which is adapted to receive a microphone. The protrusion is positioned adjacent to the worker's mouth and a pair of microphone attachment straps are mounted to the protrusion to receive the microphone. A pair of speakers are mounted on the inside of the sides of the helmet (next to the wearer's ears) and are positioned such that a wearer may also wear ear plugs if needed. Positive and negative binding posts are mounted to the outside of the helmet, and are adapted to receive communication wires. The binding posts pass thru to the inside of the helmet, and are sealed to prevent leaks.

According to multiple embodiments and alternatives, a plurality of connection points are mounted to the inside of the helmet and are adapted to receive a hard hat. A pair of chin strap attachments are also mounted to the inside of the helmet below the speakers and are adapted to receive a chin strap.

On the outside of the helmet, a plurality of accessory rails are mounted and adapted to receive additional equipment. In some embodiments, an accessory rail is positioned along the top of the helmet and an opening below this top rail is adapted to be used as a handle and/or for guiding a worker through small entrances as needed. In further embodiments, the accessory rails comprise picatinny rails. A strain relief clamp is also mounted to the outside of the helmet, and the clamp is adapted to receive any number of wires (such as air, communication, and light) to prevent accidental disconnections.

In some embodiments, a seal ring assembly is utilized to seal the suit to the helmet. In particular, the seal ring assembly compresses a yoke, a neck dam, or other garment between a seal ring and a clamp ring. Optionally, in further embodiments a thin application of a sealing compound (e.g. silicone as a non-limiting example) completes a permanent seal between the suit and the seal ring assembly. An O-ring is fitted into an O-ring gland positioned on the seal ring which then completes the seal between the suit and helmet. The seal ring assembly further comprises retainer guides which are adapted to receive the helmet and a neck dam retainer assembly (positioned on the back of the helmet). The retainer assembly provides a clamping force axially and a pair of safety latches, located on each side of the helmet, are then fitted onto tabs extending from the clamp ring. The grooves ensure the pair of safety latches are properly aligned and prevent accidental releases or slippage of the clamp ring. Once the latches are closed and the retainer assembly is secured, the helmet is sealed to the suit by the seal ring assembly.

Compared to conventional PPE systems, the helmet and suit apparatus is easier to use, provides better maneuverability, improved visibility, and better communications. In doing so, the helmet and suit apparatus provides greater protection from hazardous materials and permits much longer working times. Moreover, the helmet and suit apparatus provides complete protection from hazardous elements such as gases, vapors, aerosols, mists, small particulates, dusts, fumes, liquids, and others. The apparatus also prevents penetration of high pressure sprays and even partial or complete submersion in liquids. The helmet and suit apparatus also provides skin, respiratory, head, and falling object protection.

The helmet and suit apparatus can be used in any number of hazardous environments including but not limited to exposure to caustic liquids, dangerous gases, cleanups, confined spaces, sewage repair, any type of pipe penetration, and any other situation known to one of ordinary skill in the art wherein full protection for the worker is desired.

BRIEF DESCRIPTION OF THE FIGURES

The drawings and embodiments described herein are illustrative of multiple alternative structures, aspects, and features of the present embodiments, and they are not to be understood as limiting the scope of present embodiments. It will be further understood that the drawing Figures described and provided herein are not to scale, and that the embodiments are not limited to the precise arrangements and instrumentalities shown.

MULTIPLE EMBODIMENTS AND ALTERNATIVES

Figure 1:
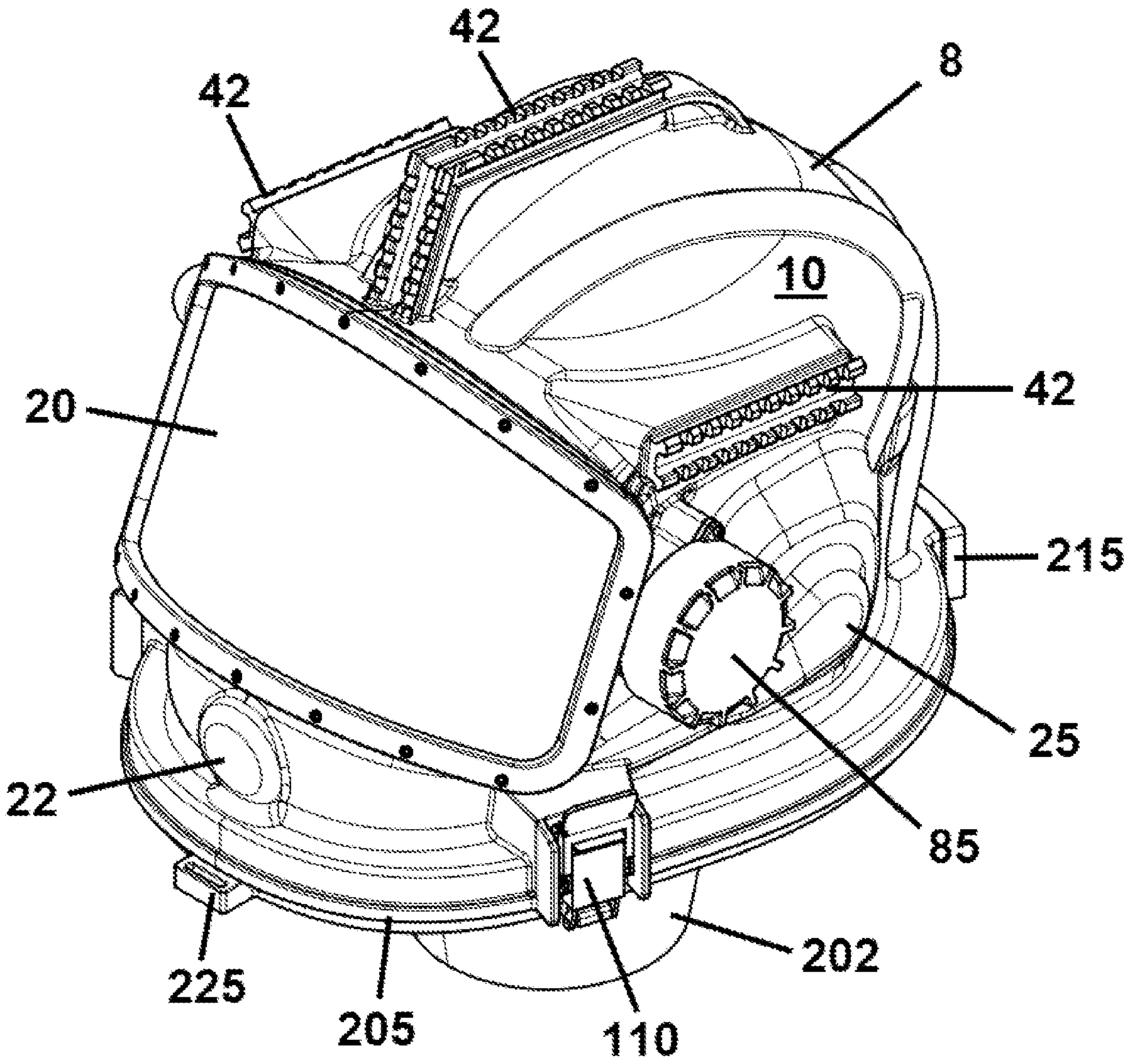
FIG. 1 is a perspective view of a helmet and suit apparatus, according to multiple embodiments and alternatives.

FIG. 1 illustrates the helmet 8 having a lens 20 and a plurality of attachment rails 42 which are mounted to the outside surface 10 of the helmet 8. The front of the helmet 8 defines a microphone protrusion 22 located below the lens 20 and in front of the wearer's mouth. The protrusion 22 is adapted to receive a microphone. The sides of the helmet 8 define ear protrusions 25 which are adapted to receive speakers 52 (best illustrated in FIGS. 2 and 8) and permit a user to wear earplugs if desired. As discussed in more detail below, the helmet 8 is connected to a suit 200 and yoke 202 by a seal ring assembly 205. The seal ring assembly may also secure to a neck dam or any other type of garment that needs to be secured to helmet 8, and it is understood that the embodiments herein are not limited to attachment to a yoke. A pair of safety latches 110 and a retainer assembly 215 securely attach and seal the helmet 8 to the suit 200. A lanyard attachment point 225 extends from the seal ring assembly 205, which is adapted to receive a lanyard or other types of cord and assists the wearer in donning and doffing the helmet 8 from the seal ring assembly 205. As discussed in greater detail below, an air control system 60 permits continuous air flow in and out of the helmet 8, and maintains a positive pressure within the helmet 8. FIG. 1 illustrates the air exhaust valve 85 of the air control system 60.

Figure 2:
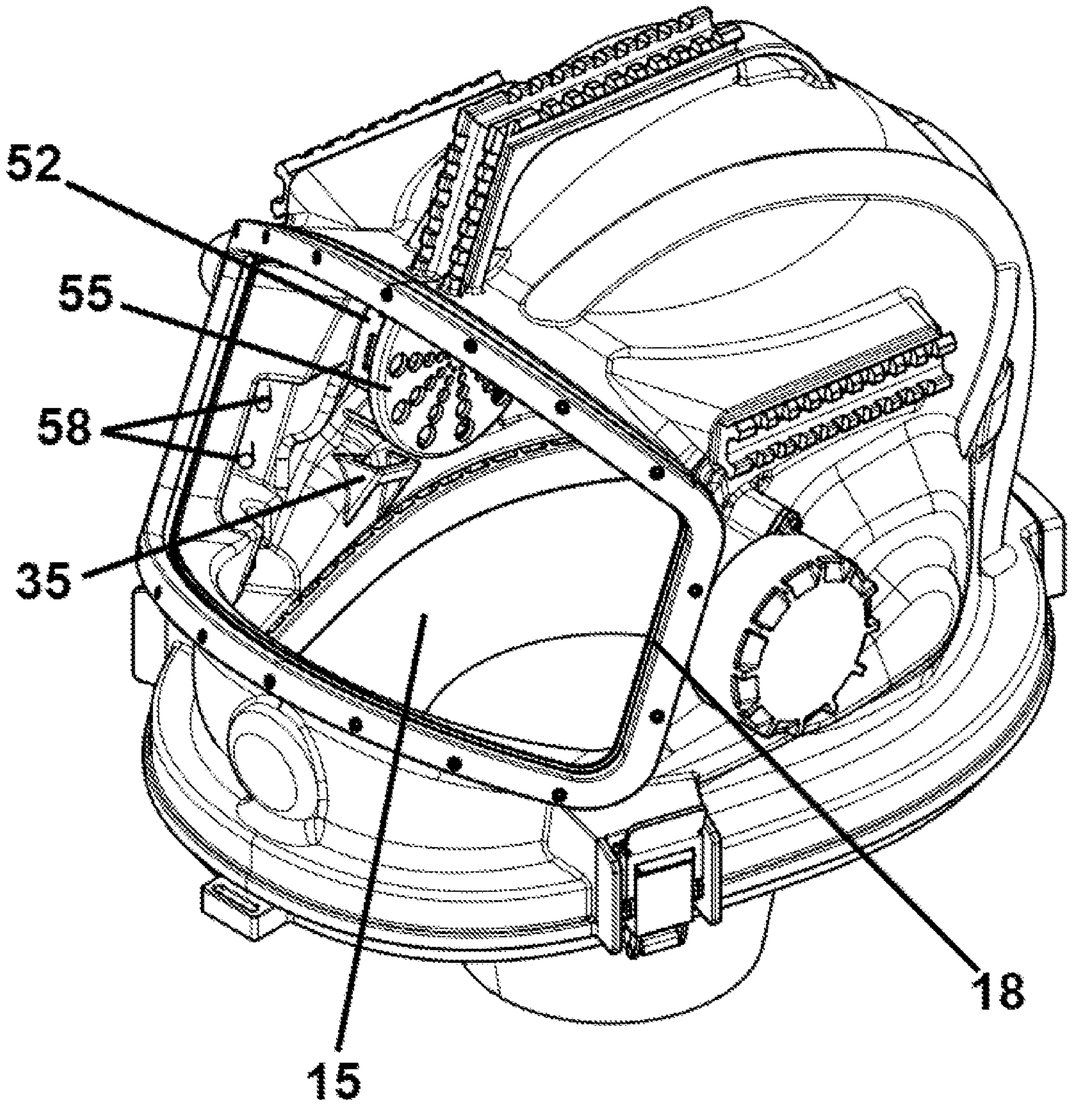
FIG. 2 is a perspective view of a helmet and suit apparatus without a lens, according to multiple embodiments and alternatives.

As shown in FIG. 2, the front of the helmet 8 defines a bezel 18 which is adapted to receive the lens 20 and the bezel 18 defines a lens opening 15. The bezel 18 is connected to the helmet 8 by a plurality of screws, or any other attachment mechanism known to one of ordinary skill in the art. FIG. 2 illustrates one of the chin strap attachment points 35 which are adapted to receive a chin strap. As discussed below, in some embodiments the helmet 8 is hard-wired with a communication system 50 (e.g. a two-way open microphone communication as a non-limiting example). The communication system 50 comprises a pair of binding posts 58 (including a positive and negative post in some embodiments), which are positioned on the outside surface 10 of the helmet 8 and adapted to receive wiring. As illustrated in FIG. 2, the posts 58 pass through the wall and into the inside of the helmet 8. In some embodiments, the pair of binding posts 58 are connected to the inside surface 11 of the helmet via a stud and nut, which is sealed with gaskets to prevent leaks. The communication system 50 further comprises a pair of speakers 52 which are mounted to the inside surface 11 of the helmet and are positioned adjacent to the wearer's ears. A speaker cover 55 with a plurality of openings is mounted over each speaker 52.

Figure 3:
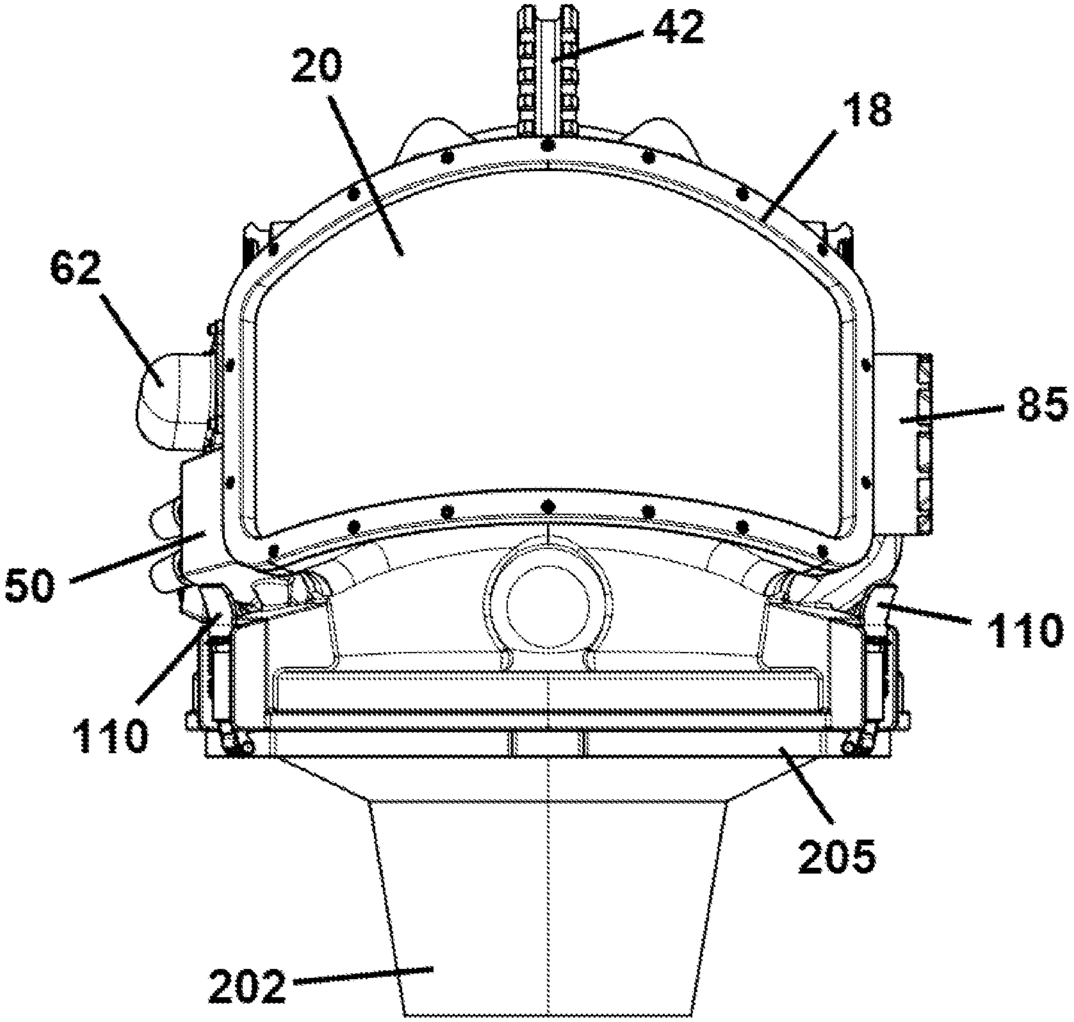
FIG. 3 is a front view of a helmet and suit apparatus, according to multiple embodiments and alternatives.
Figure 4:
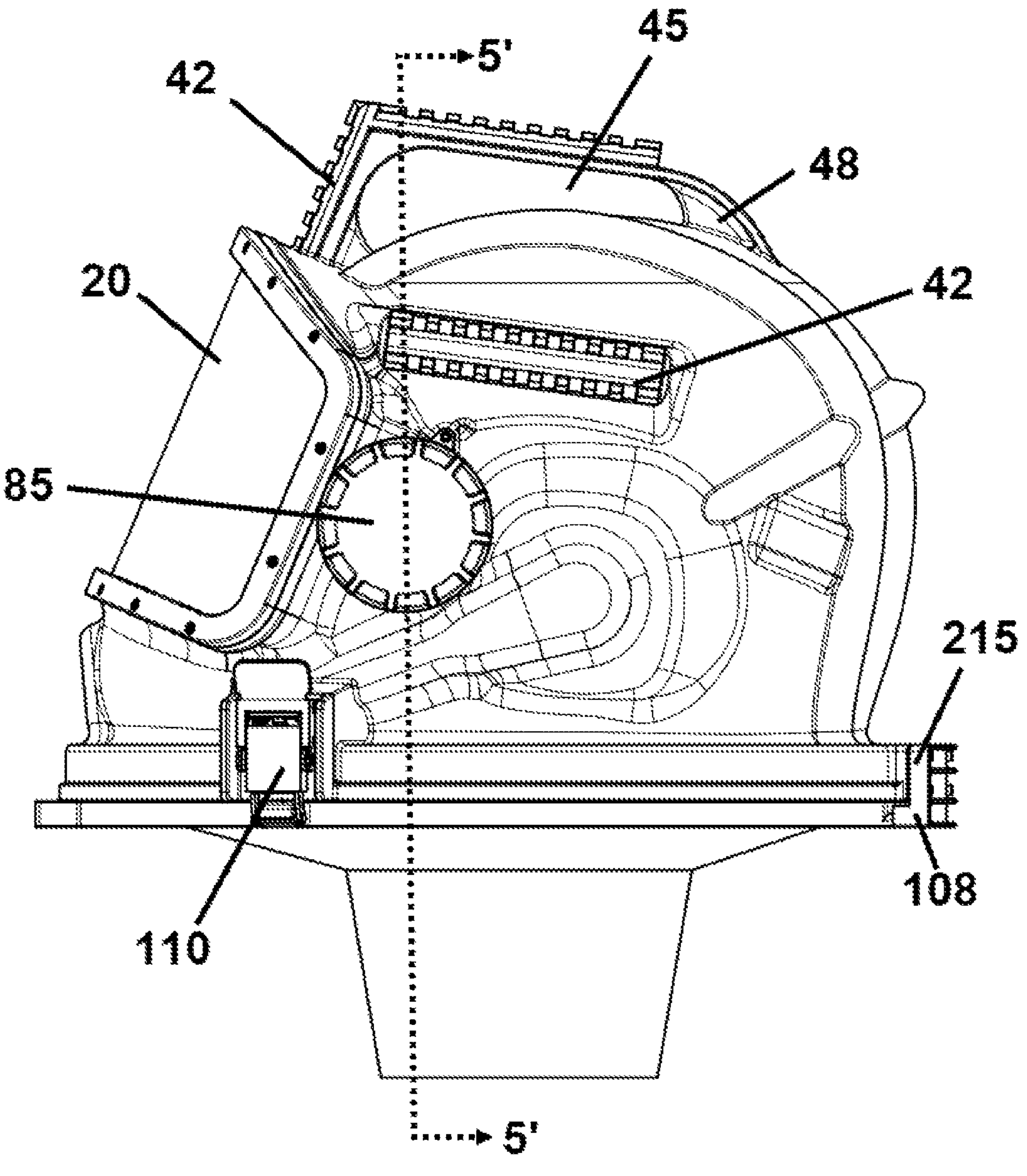
FIG. 4 is a right side view of a helmet and suit apparatus, according to multiple embodiments and alternatives.

FIG. 3 illustrates the air inlet 62 and the air exhaust valve 85 of the air control system 60. As previously noted, the yoke 202 is securely connected to the helmet 8 via the seal ring assembly 205. Furthermore, a pair of safety latches 110 (which are positioned on both sides and towards the front of helmet 8 as shown in FIG. 4), connect the helmet 8 to the seal ring assembly 205. The air exhaust valve 85 is positioned behind and below the bezel 18 which provides some protection from debris coming towards the wearer.

Figure 6:
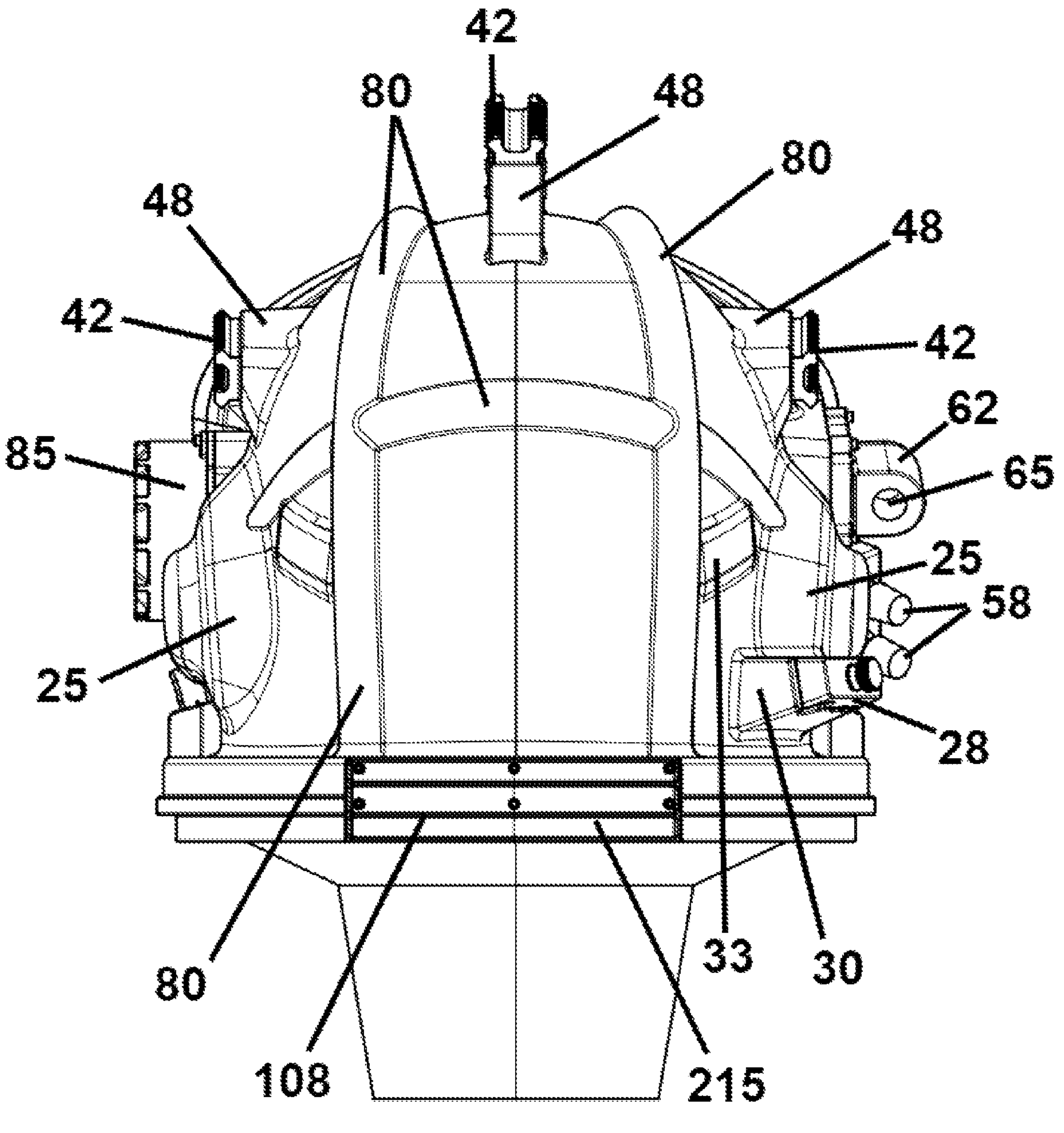
FIG. 6 is a rear view of a helmet and suit apparatus, according to multiple embodiments and alternatives.

As illustrated in FIGS. 4 and 6, the outside surface 10 of helmet 8 defines a plurality of rail protrusions 48 which are adapted to receive the rails 42. In some embodiments, a rail 42 is positioned along the top of the helmet and its corresponding protrusion 48 defines an opening 45 which can be used as a handle and/or for guiding the worker into tight spaces. In some embodiments, the top rail 42 comprises a first component which is generally parallel to the surface of the lens 20 and a second component which runs along a portion of the top of the helmet 8. In some embodiments, the first and second component of the top rail 42 intersect at an angle that is greater than ninety degrees. As illustrated in FIG. 4, the lens 20 is positioned at a slight upwards angle relative to the arrows from line 5'-5' in FIG. 4 (which is the same plane as the ground surface).

As shown in FIGS. 4 and 6, a retainer assembly 215 is positioned at the back of the helmet 8 and connects to the seal ring assembly 205. The retainer assembly 215 comprises a clamp ring tab 108, which is adjustably connected to the back of the helmet 8, and clamps onto the clamp ring 220 of the seal ring assembly 205.

Figure 5A:
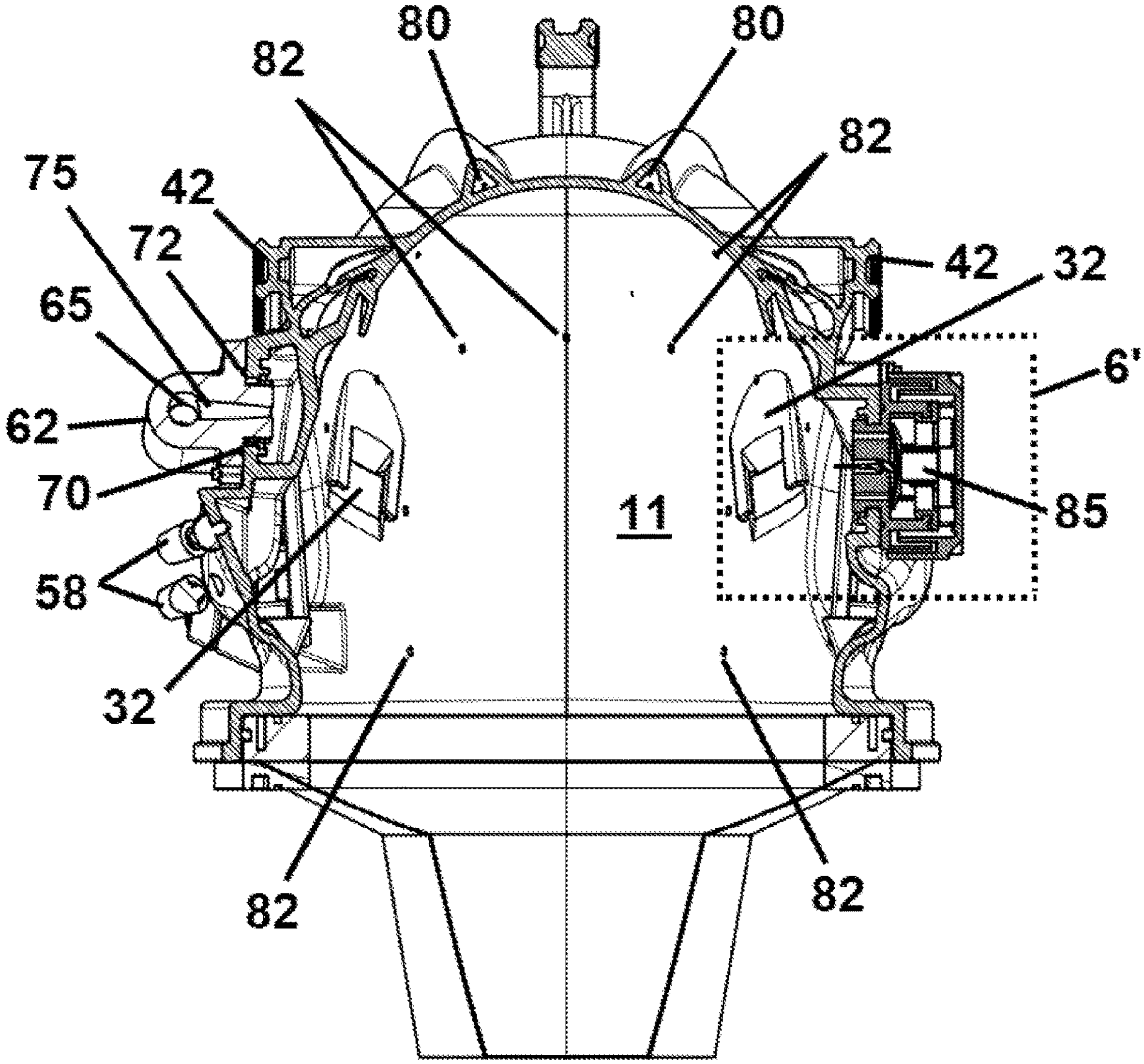
FIG. 5A is a cross-section view of a helmet and suit apparatus, across line 5'-5' of FIG. 4, according to multiple embodiments and alternatives.

FIG. 5A illustrates the attachment points 32 mounted to the inside surface 11 of helmet 8. In some embodiments, there are four attachment points 32 positioned throughout the inside surface 11 and the points 32 are adapted to receive a universal hard hat. FIG. 5A further illustrates the pair of binding posts 58 of the communication system 50 and the accessory rails 42 mounted on the outside surface 10 of the helmet 8.

According to multiple embodiments and alternatives, the helmet 8 is supplied with air via a hose that is connected to a compressor. In some embodiments, air first enters the air control system 60 via the air inlet 62 which defines an inlet port 65. The air inlet 62 is attached to the helmet via a cam locking system and additional screws as needed. The air inlet 62 further defines an o-ring gland 70 which is adapted to receive an o-ring 72. The o-ring 72 is fitted onto the gland 70 and provides a seal between the air inlet 62 and the helmet 8. In further embodiments, the inlet port 65 defines a female threaded hole and is adapted to receive an air hose barb which in turn is connected to a compressor.

Following passage into the inlet port 65, air enters into a series of passages 75 and is distributed throughout the inside of the helmet. Much of the air is distributed to a plurality of lens ports 78 (best illustrated in FIG. 8) which are positioned to provide air flow to the inside surface of the lens 20 for anti-fogging purposes. Air also passes through a series of distribution channels 80, which are positioned along the top and sides of the helmet 8, and through a plurality of head ports 82 (also illustrated in FIG. 8) which supply air to the wearer's head. After entering the helmet chamber, air exists through the air exhaust valve 85.

Figure 5B:
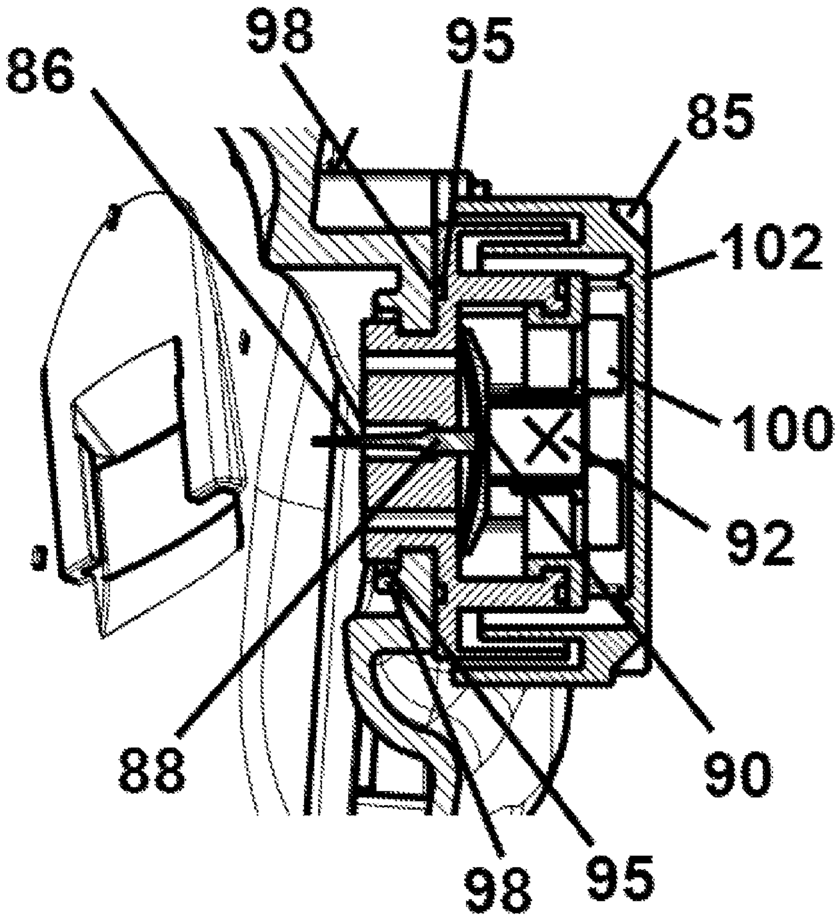
FIG. 5B is a close-up view of an air control exhaust valve, from the region illustrated by the box 6' of FIG. 5A, according to multiple embodiments and alternatives.

In some embodiments, the exhaust cover 102 is attached to the outside surface 10 of the helmet 8 via a cam locking system. As shown in FIG. 5B, in further embodiments the air exhaust valve 85 defines a pair of o-ring glands 95 which are adapted to receive a pair of o-rings 98 and provides a seal to the helmet 8. The air exhaust valve 85 may also be secured in place by screws as needed. As shown in FIG. 5B, the air exhaust valve 85 further comprises an umbrella valve 88 having a stem and a flap, wherein the stem can be fitted into an exit channel 86 defined by the air exhaust valve 85. In some embodiments, the umbrella valve 92 provides back-flow prevention by preventing air flow only out of the exit channel 86. A pressure plate 90 having a spring 92 (illustrated by the "X" in FIG. 5B) engages the flap of the umbrella valve 88 and provides a force that opposes the opening of the umbrella valve 88 (i.e. provides a closing force onto umbrella valve 88).

After passing through the umbrella valve 88 and overcoming the opposing force applied by the pressure plate 90 and spring 92, air passes through the labyrinth exhaust 100 of the exhaust cover 102 which comprises a series of passages having right angle turns that stop solid debris from entering into the cover 102 and prevent failure of umbrella valve 88. After passing through the labyrinth exhaust 100 of the exhaust cover 102, the air passes into the ambient air.

FIG. 6 illustrates the series of distribution channels 80 which connect the air inlet 62 and air passages 75 to the plurality of head ports 82 and a plurality of lens ports 78. The channels 80 span the length of the helmet 8 and also span laterally (as shown in FIG. 6). The helmet 8 defines a plurality of rail protrusions 48 which are adapted to receive the accessory rails 42. The helmet 8 further defines a pair of ear protrusions 25 and a clamp protrusion 30 which is adapted to receive the strain relief clamp 28. A clamp ring tab 108 is adjustably connected to the rear and bottom 12 of helmet 8 and is adapted to engage the clamp ring 220 of the seal ring assembly 205. In some embodiments, the helmet 8 further defines hard hat attachment point protrusions 33 positioned adjacent to the ear protrusions 25.

Figure 7:
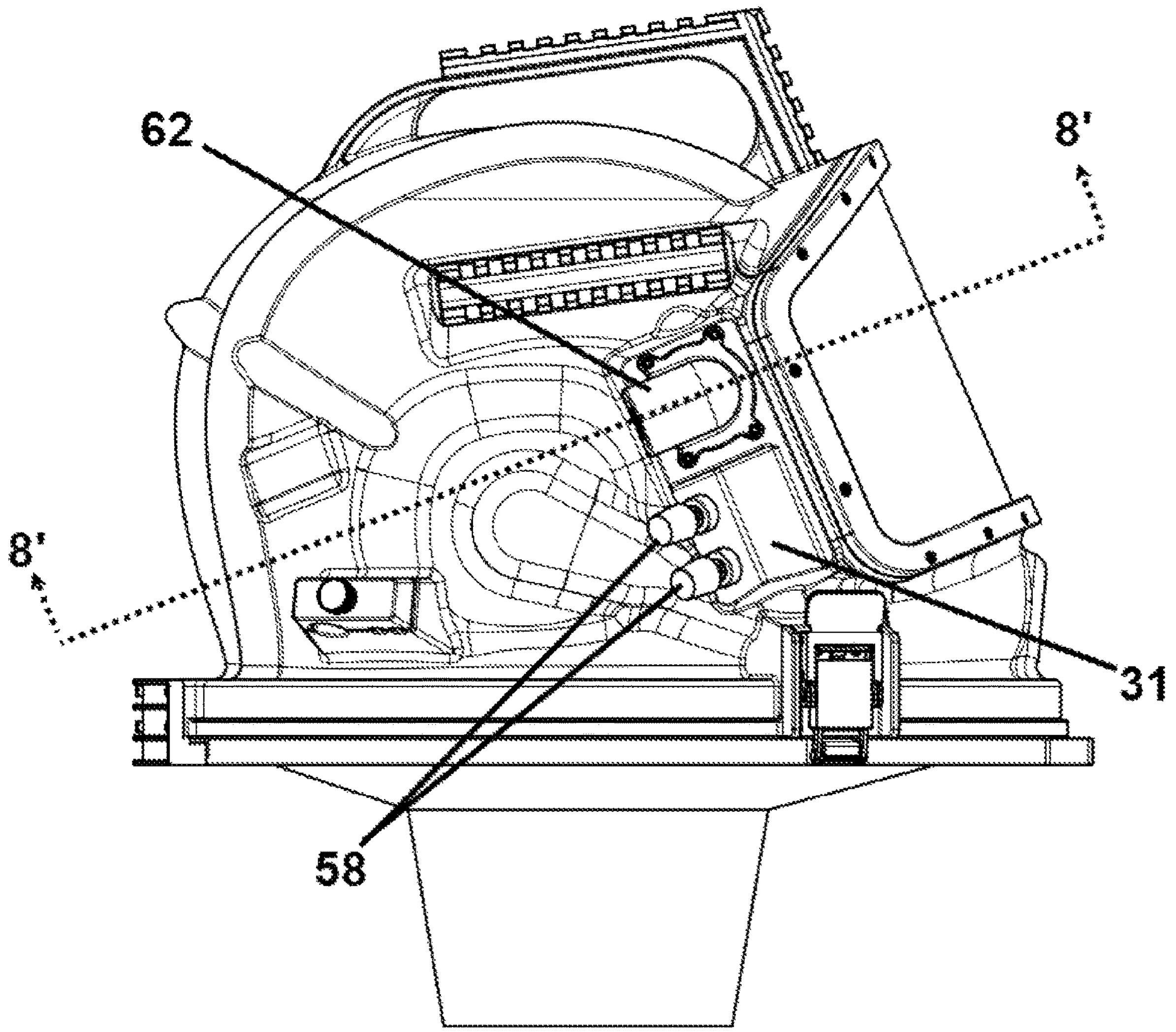
FIG. 7 is a left side view of a helmet and suit apparatus, according to multiple embodiments and alternatives.
Figure 8:
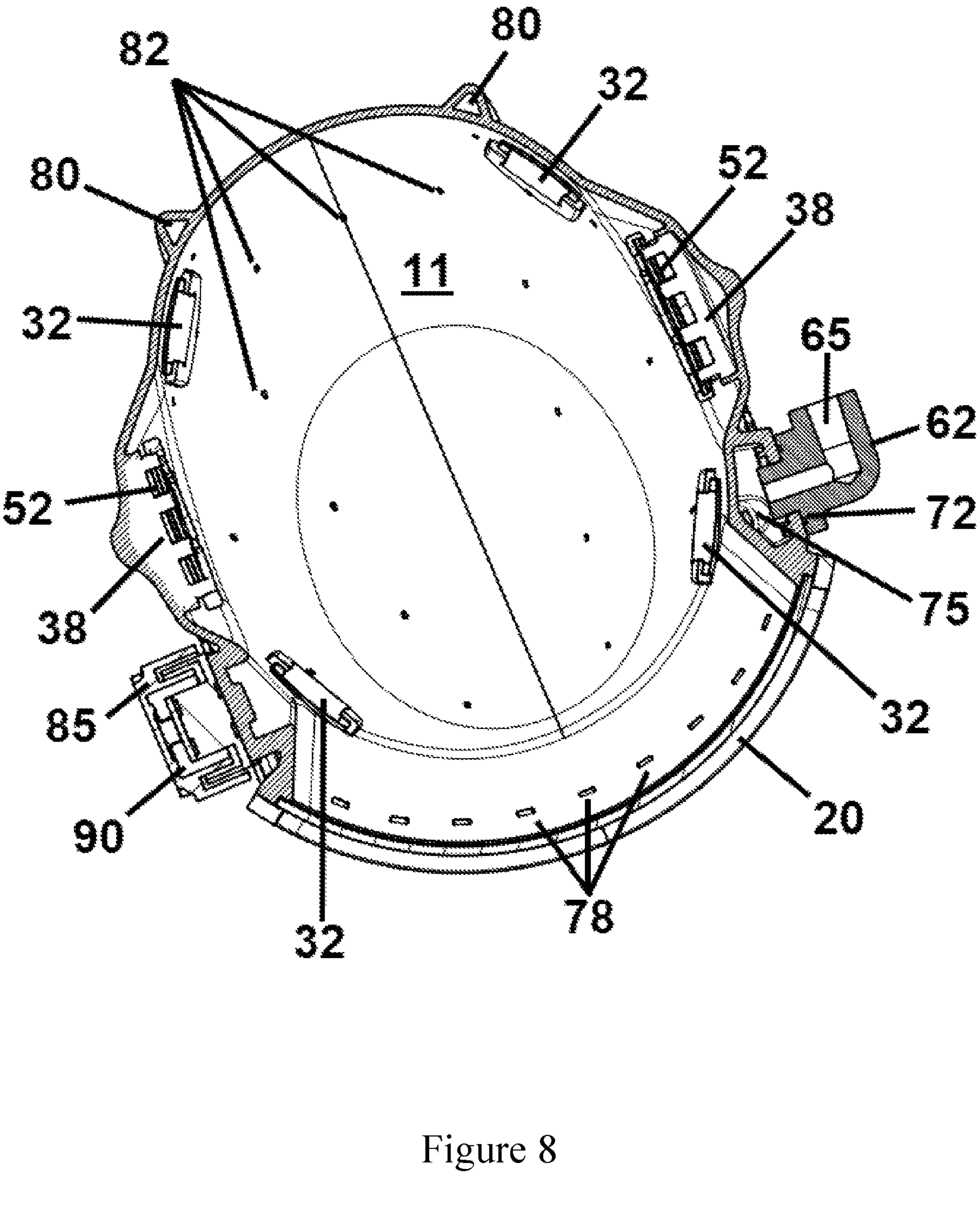
FIG. 8 is a cross-section view of a helmet and suit apparatus, across line 8'-8' of FIG. 7, according to multiple embodiments and alternatives.

As illustrated in FIGS. 6-8, according to multiple embodiments and alternatives, the air inlet 62 faces towards the rear of helmet 8 and at a slight downward angle generally parallel to line 8'-8' in FIG. 7. In some embodiments, the air inlet 62 is positioned between the lens 20 and one of the ear protrusions 25. FIG. 7 illustrates the outside surface 10 of the helmet 8 defining a binding post protrusion 31 which is adapted to receive the pair of binding posts 58 of the communication system 50, which are then positioned adjacent to the air inlet 62, and between the lens 20 and one of the ear protrusions 25. The binding posts 58 also face towards the rear of helmet 8 at a slight downward angle generally parallel to line 8'-8' in FIG. 7. The binding post protrusion 31, and the position of the pair of binding posts 58, protect the posts 58 from debris and other materials coming towards the wearer.

Figure 10:
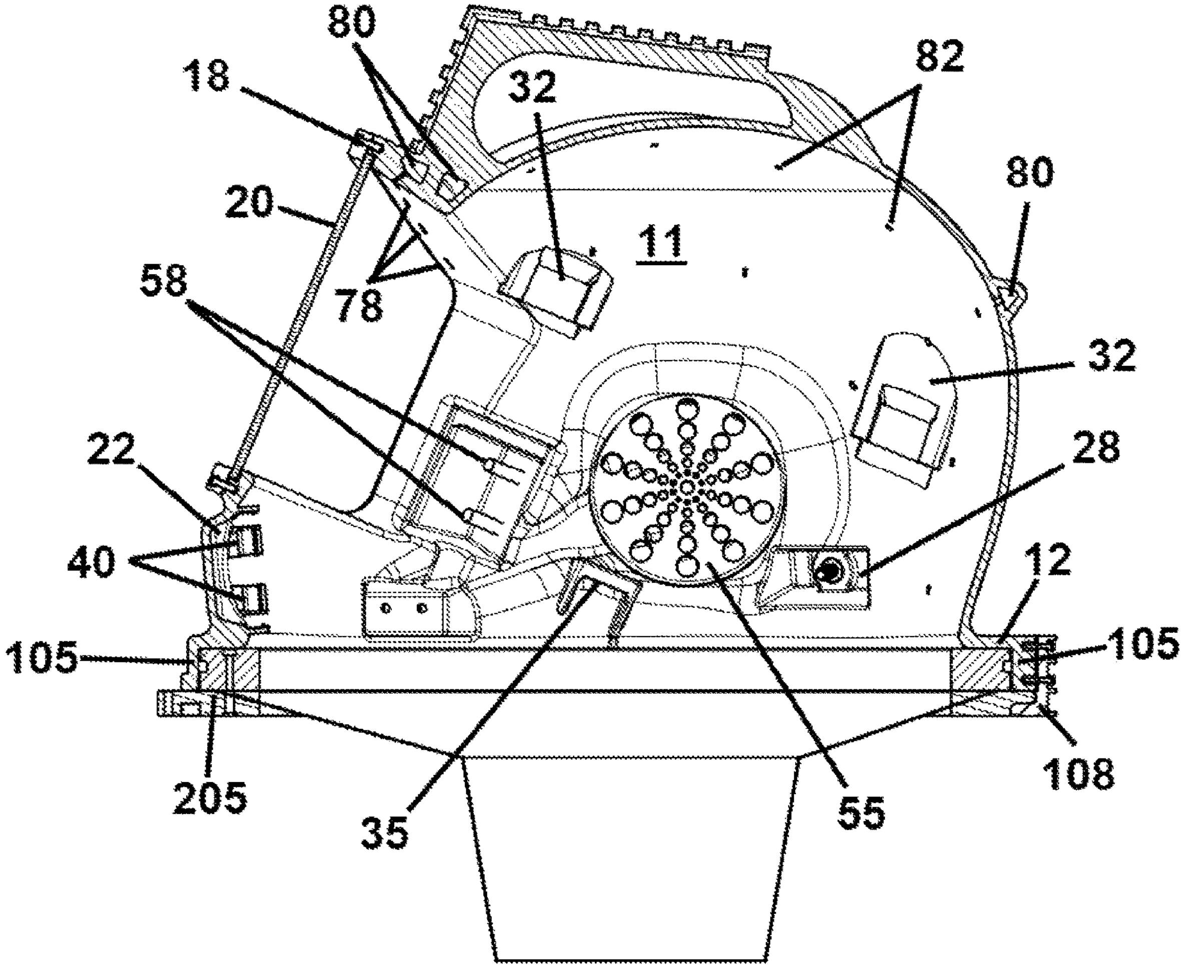
FIG. 10 is a cross-section view of a helmet and suit apparatus, across line 10'-10' of FIG. 9, according to multiple embodiments and alternatives.

FIG. 8 illustrates the distribution channels 80 and the plurality of head ports 82 positioned along the inside surface 11 of the helmet which cool the wearer's head. As previously noted, a plurality of attachment points 32 are also attached to the inside surface 11 of the helmet and are adapted to receive a hard hat. As shown in FIGS. 8 and 10, in some embodiments a plurality of lens ports 78 are positioned along the top of the lens 20. The lens ports 78 increase in size as the distance from the air inlet 62 increases and the ports 78 remove fog from the lens 20. The air inlet 62 defines an inlet port 65 which, in some embodiments, comprises a first component integrally connected to a second component at a right angle before entering into the air passages 75 of the air control system 60. As shown in FIG. 8, a pair of snap grooves 38 are mounted to the inside surface of the ear protrusions 25, and are adapted to receive the speakers 52 of the communication system 50. The pair of snap grooves 38 are positioned near the wearer's ears.

Figure 9:
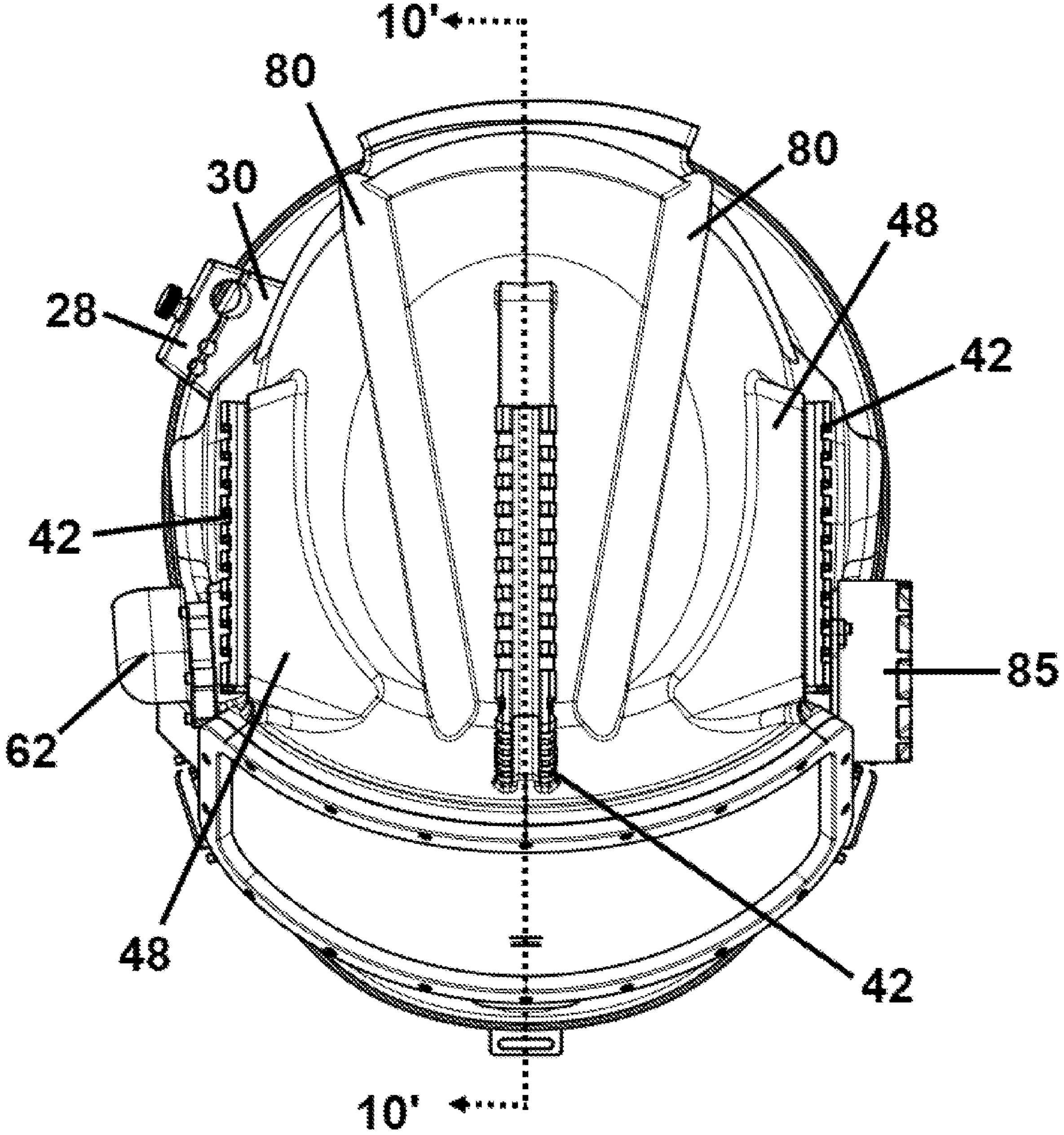
FIG. 9 is a top view of a helmet and suit apparatus, according to multiple embodiments and alternatives.

As shown in FIG. 9, the accessory rails 42 are mounted to the rail protrusions 48. In addition, the rails 42 are generally positioned parallel to line 10'-10' of FIG. 9. FIG. 9 illustrates air inlet 62 and air exhaust valve 85 of the air control system 60. In addition, the clamp protrusion 30 and the strain relief clamp 28 define a series of openings which are adapted to receive and secure a plurality of wires (such as air, communication, and light) to prevent accidental disconnections. In some embodiments, the strain relief clamp 28 is positioned on the same side of helmet 8 as the air inlet 62. In further embodiments, the strain relief clamp 28 is positioned below and behind both the air inlet 62 and posts 58, and is adapted to receive a hose and/or wires connected to same.

FIG. 10 provides a cross-section view of the helmet 8 along line 10'-10' of FIG. 9. As previously noted, attachment points 32 (which are adapted to receive hard hats) are mounted to the inside surface 11 of the helmet 8. FIG. 10 further illustrates the speaker cover 55 positioned over the speaker 52, the chin strap attachment point 35, the binding posts 58 of the communication system 50, and the inside of strain relief clamp 28. Positioned below the lens 20 and in the front of helmet 8, a pair of microphone attachment straps 40 are mounted to the inside of the microphone protrusion 22. The straps 40 are adapted to receive and secure a microphone. The lens 20 is secured to the helmet 8 by the bezel 18 and a sealing gasket. A plurality of lens ports 78 are positioned along the top length of the inside surface of the lens 20 and a plurality of head ports 82 are positioned throughout the inside surface 11 of the helmet 8 to cool the wearer's head. As shown in FIG. 10, the bottom 12 of the helmet 8 defines a shoulder 105 which is adapted to engage the seal ring assembly 205. The clamp ring tab 108 is adjustably connected to shoulder 105, and securely engages the clamp ring 220. In some embodiments, the bottom 12 of the helmet 8 mates with the seal ring 208 of the seal ring assembly 205.

Figure 11:
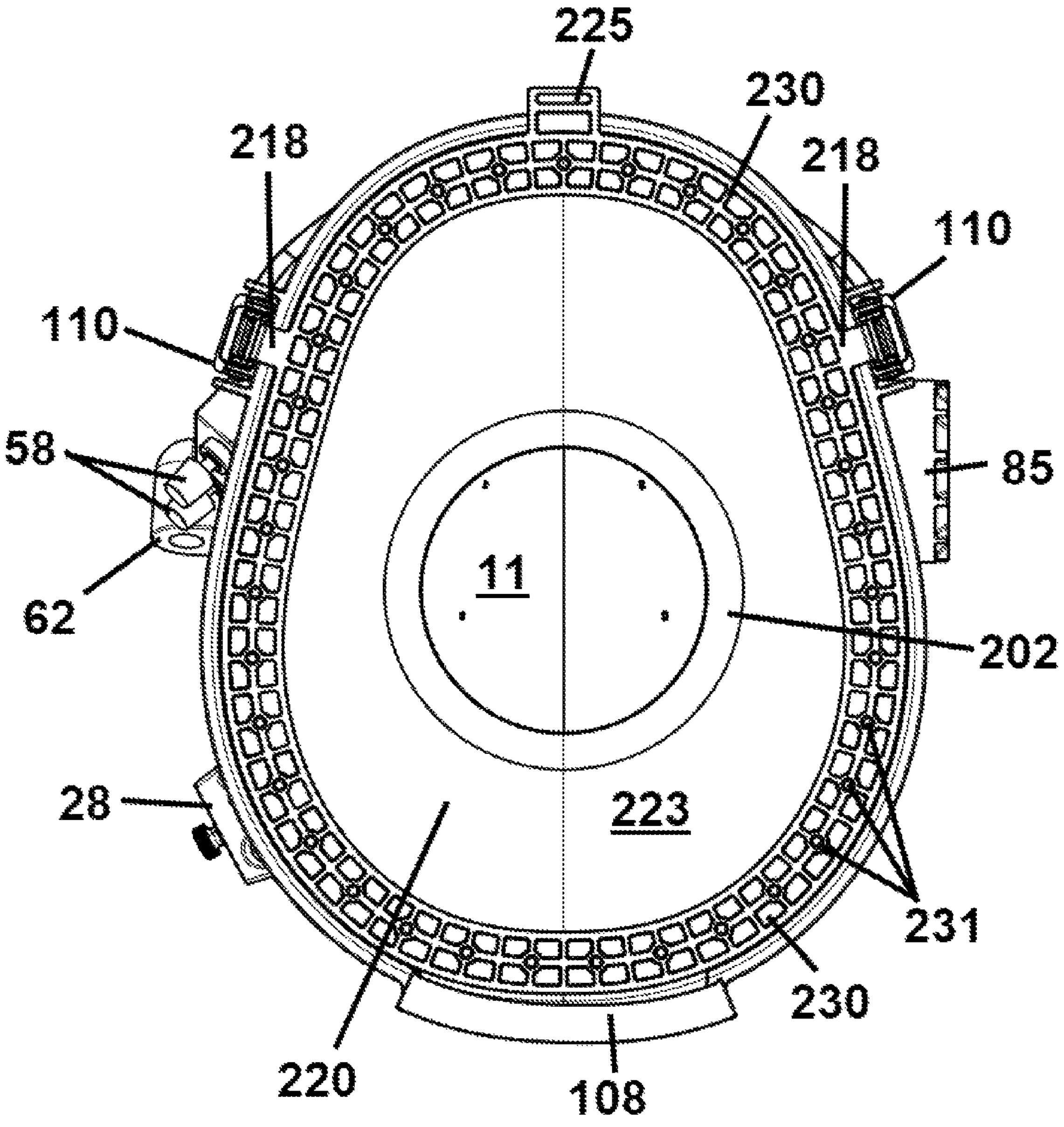
FIG. 11 is a bottom view of a helmet and suit apparatus, according to multiple embodiments and alternatives.
Figure 12:
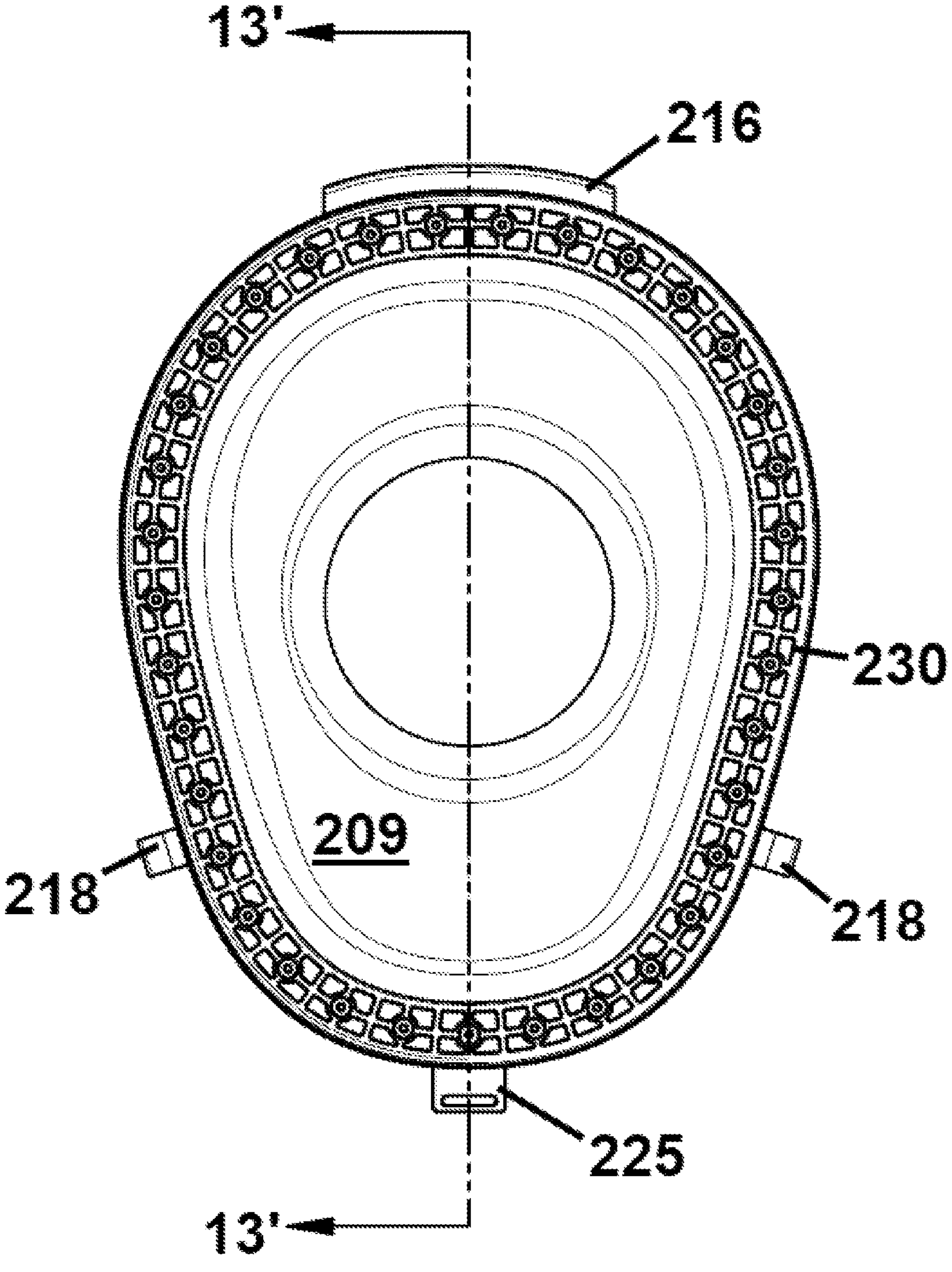
FIG. 12 is a top view of a suit and seal ring assembly without a helmet, according to multiple embodiments and alternatives.

FIG. 11 is a bottom view of a helmet 8 secured to a seal ring assembly 205, which is connected to a yoke 202. As discussed in more detail below, the seal ring assembly 205 has a a clamp ring 220, wherein its bottom surface 223 defines a ridged frame 230 positioned adjacent to the perimeter of ring 220. As illustrated in FIGS. 11-12, a pair of safety latch tabs 218 extend outward from clamp ring 220 and are adapted to receive the pair of safety latches 110. A lanyard attachment point 225 extends outward from the front of clamp ring 220, and is adapted to receive a lanyard or other types of cord which assist in donning and doffing helmet 8. The clamp ring tab 108 secures around the clamp ring 220. As illustrated in FIGS. 11 and 13B, the yoke 202 is compressed between the seal ring 208 and the clamp ring 220 via a plurality of screws 232.

Figure 13A:
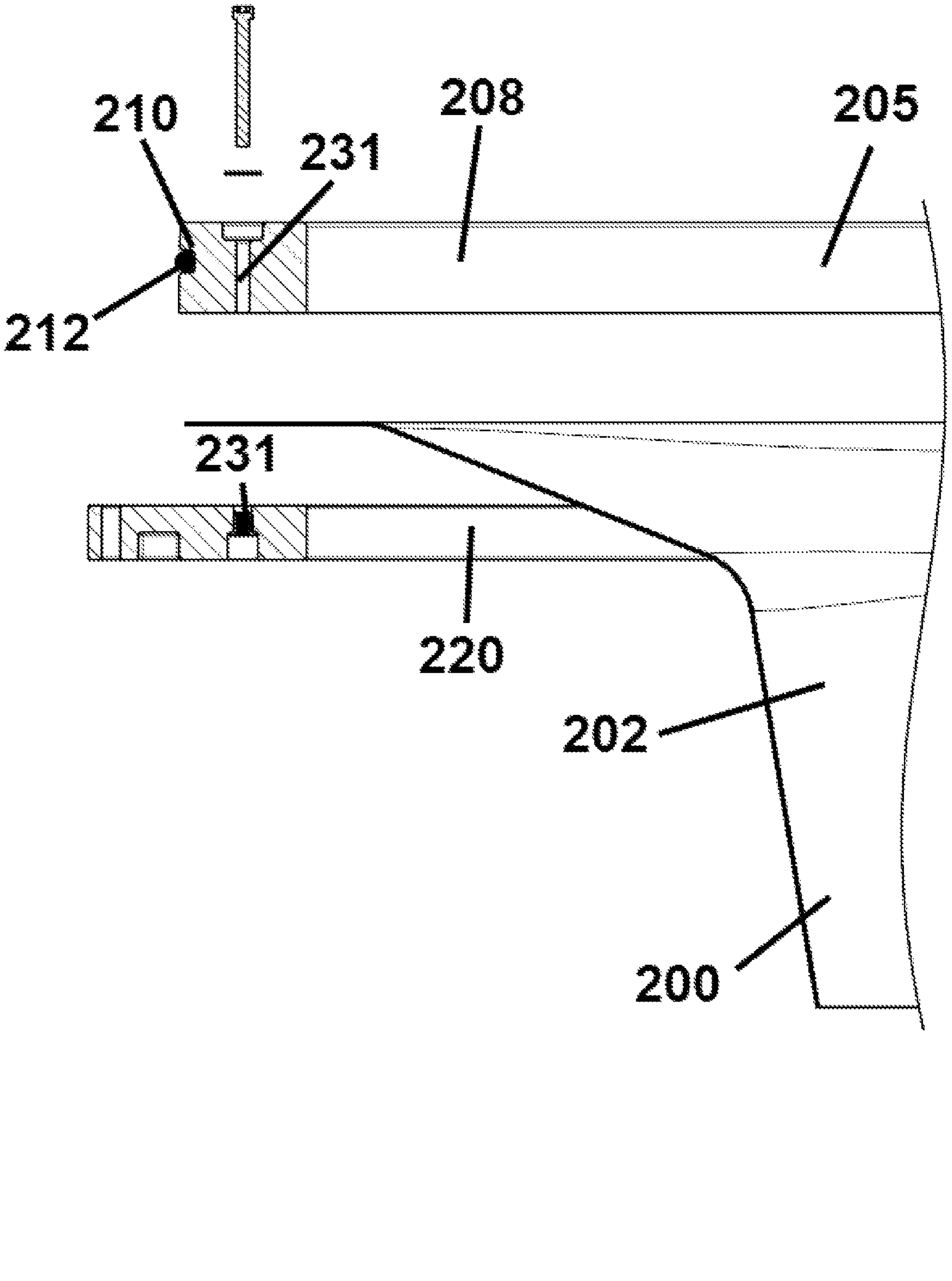
FIG. 13A is a close up, cross-section, and exploded view of a seal ring assembly without a helmet, across line 13'-13' of FIG. 12, according to multiple embodiments and alternatives.
Figure 13B:
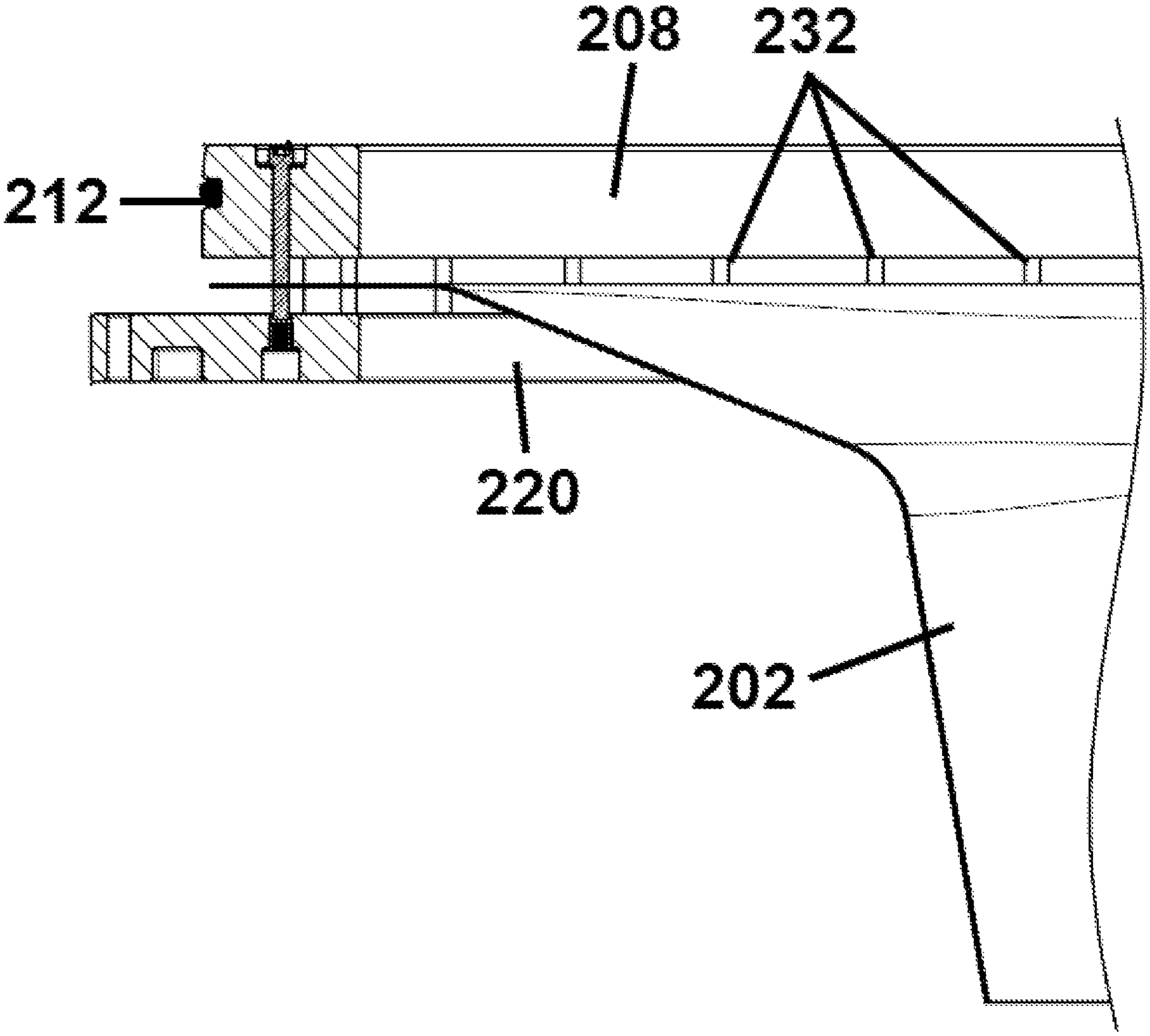
FIG. 13B is a close up and cross-section view of a seal ring assembly without a helmet, across line 13'-13' of FIG. 12, according to multiple embodiments and alternatives.
Figure 13C:
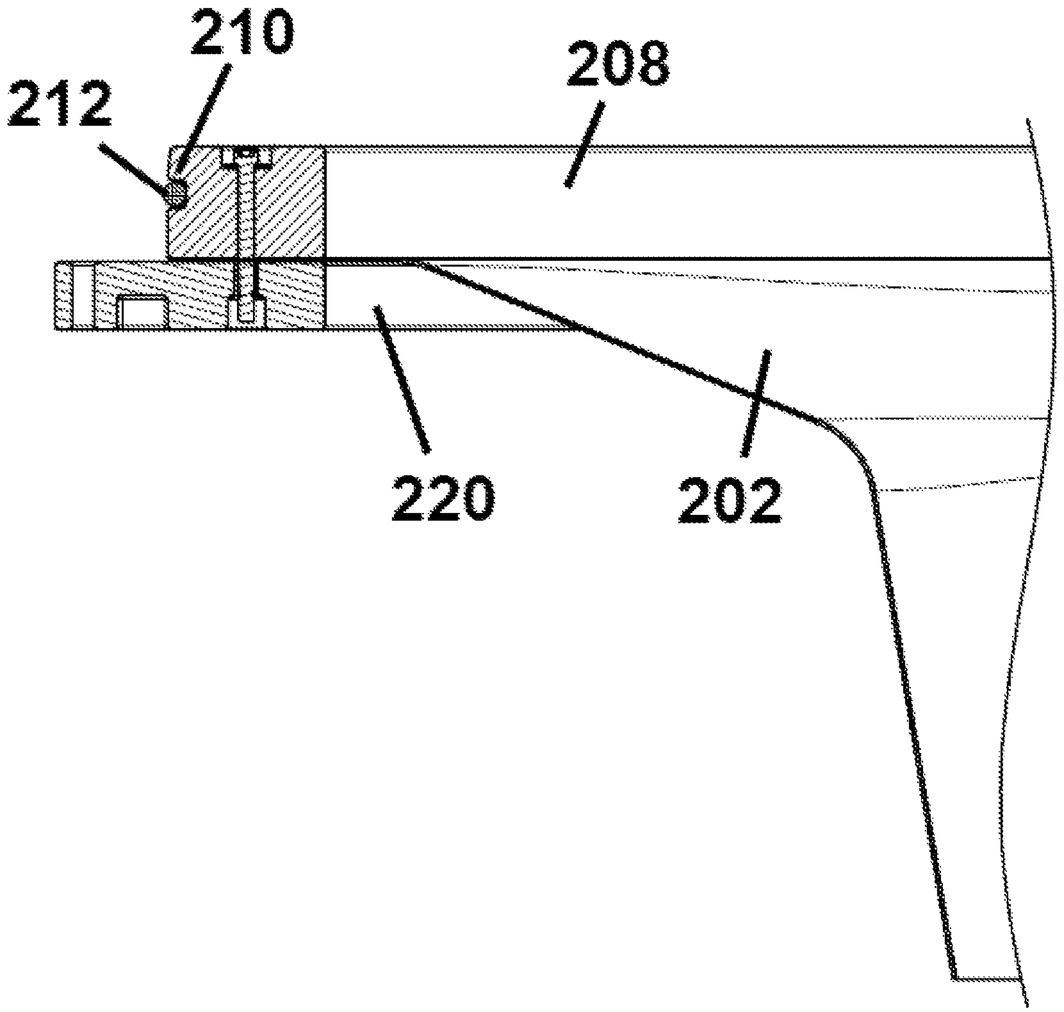
FIG. 13C is a close up and cross-section view of a seal ring assembly in a closed position without a helmet, across line 13'-13' of FIG. 12, according to multiple embodiments and alternatives.

FIG. 12 is a top view of the seal ring assembly 205 without a helmet 8, and FIGS. 13A-13C provide cross-section views of the seal ring assembly 205 along line 13'-13' illustrated in FIG. 12. According to multiple embodiments and alternatives, the seal ring assembly 205 comprises a seal ring 208 and a clamp ring 220, wherein a yoke, a dam, or any other garment is secured between said seal ring 208 and clamp ring 220. In further embodiments, the seal ring assembly 205 comprises a retainer assembly 215 having the clamp ring tab 108 which is adjustably connected to the rear of the helmet 8 and mates with the retainer 216 (also illustrated in FIG. 14) that is positioned on the rear of the clamp ring 220. FIG. 12 further illustrates the top surface 209 of the clamp ring 220 which defines a ridge frame 230 adjacent to its outer edge.

As shown in FIGS. 13A-13C, the seal ring assembly 205 comprises a seal ring 208 which defines a screw receiving bore 231 and receives a washer, as a non-limiting example. The outside surface of the seal ring 208 defines an o-ring gland 210 which is adapted to receive an o-ring 212. A yoke 202 from a suit 200 is positioned between the seal ring 208 and the clamp ring 220. It will be appreciated by one of ordinary skill in the art that a yoke is a standard tubular extension to a suit that extends upwards toward a wearer's head and acts as the interface between the suit and a diving helmet. In this configuration, the yoke is attached to a suit and is fully sealed on the chest, shoulders, and back area of the suit. The yoke is typically permanently attached to the upper part of a suit and is often trimmed for attachment for the desired configuration or purpose (i.e. to a helmet). A neck dam is typically made of a flexible material and is funnel shaped, such that the neck dam can stretch over the wearer's head to form a seal around the neck. When a neck dam is connected to the seal ring assembly 205 and a helmet 8, the assembly protects the wearer from the neck up. When a yoke (that is permanently attached to a full body suit) is secured to the seal ring assembly 205 and a helmet 8, the helmet and suit apparatus 5 provides total encapsulation to the wearer. It will be appreciated that any type of material or garment can be sealed by the seal ring assembly 205, and the present embodiments are not limited to a yoke or neck dam.

The assembly 205 further comprises a clamp ring 220 which defines a boring that is adapted to receive the screw that passes through the bore 231 of the seal ring 208. As illustrated in FIGS. 13A-13B, in some embodiments the top edge of the yoke 202 (or a neck dam or any other type of garment) is compressed between the seal ring 208 and the clamp ring 220 by a plurality of screws 232. Once screwed together, a permanent seal is formed between the suit 200 and the seal ring assembly 205 as illustrated in FIG. 13C. In some embodiments, an optional sealing compound is also added between the seal ring 208 and clamp ring 220.

Figure 14:
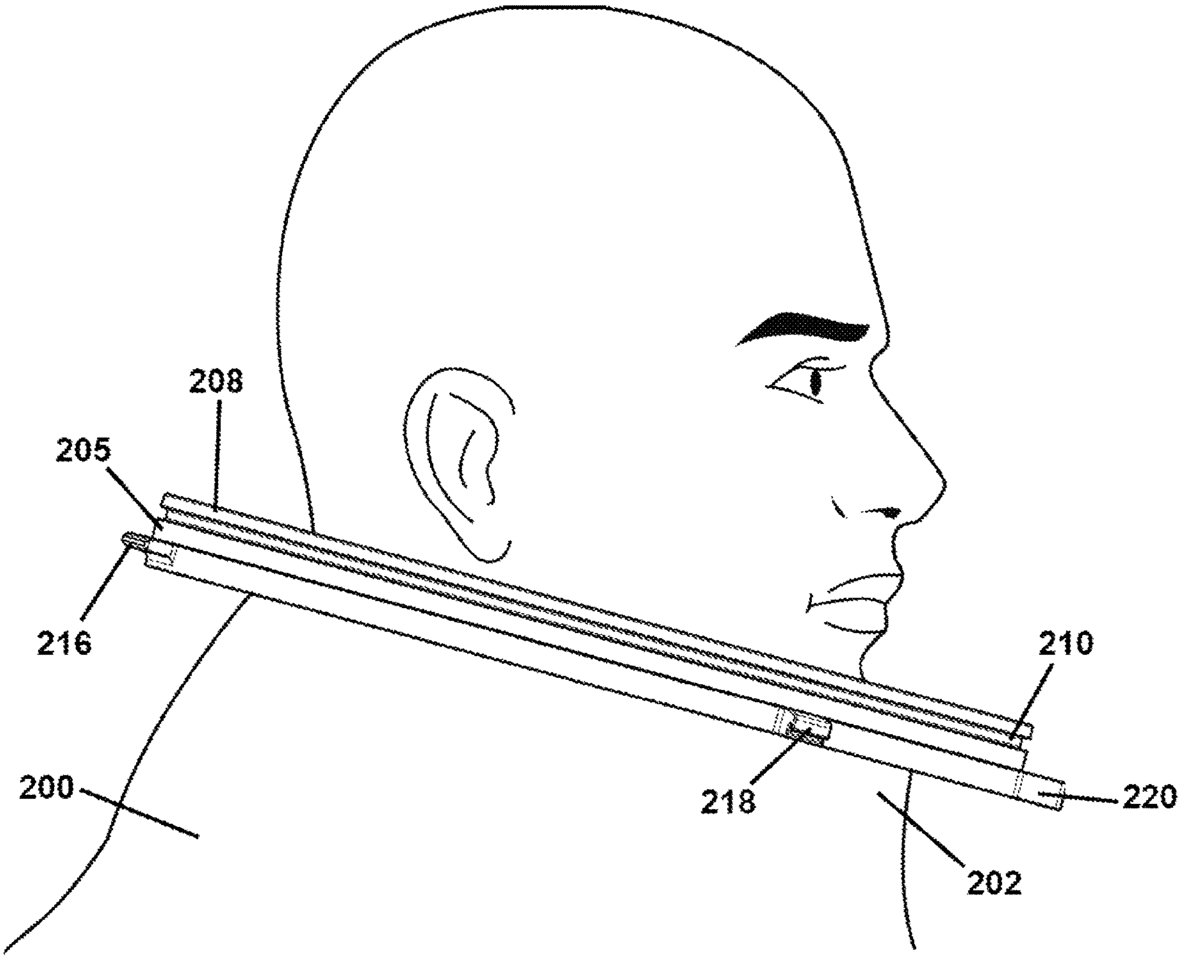
FIG. 14 is a side view of a seal ring assembly and a worker in a suit without a helmet, according to multiple embodiments and alternatives.
Figure 15:
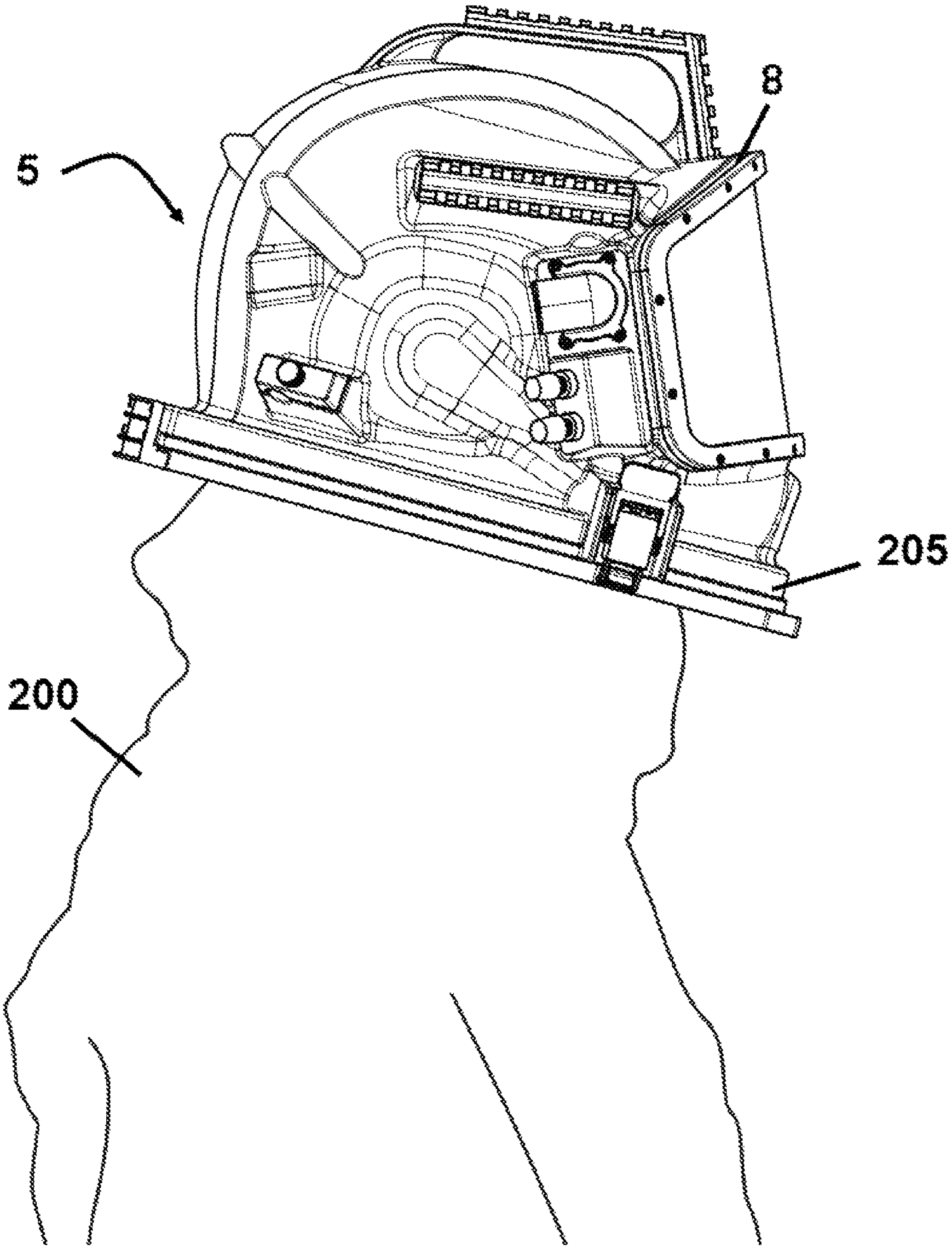
FIG. 15 is a side view of a worker in a helmet and suit apparatus, according to multiple embodiments and alternatives.
Figure 16:
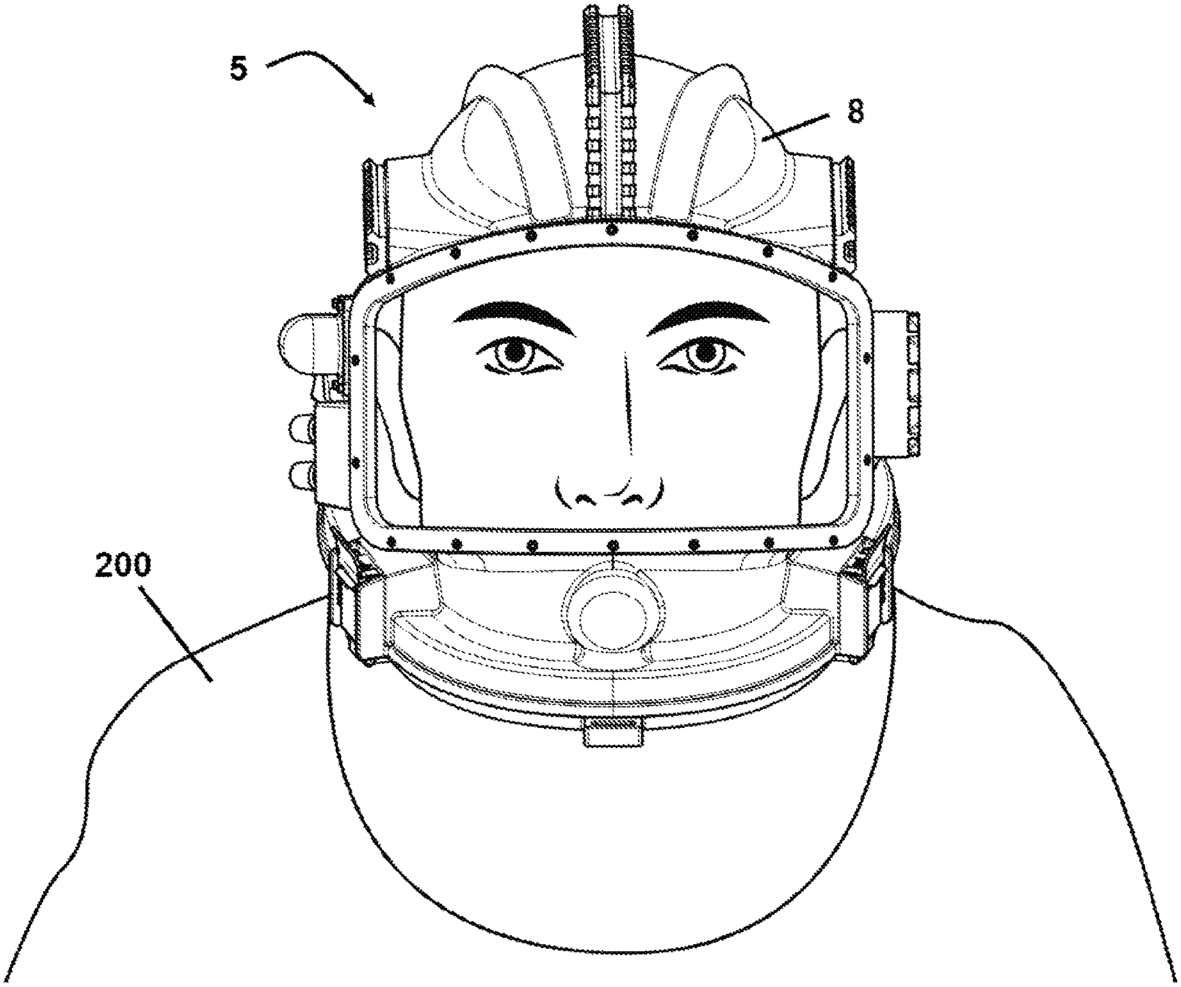
FIG. 16 is a front view of a worker in a helmet and suit apparatus, according to multiple embodiments and alternatives.

FIG. 14 illustrates a worker in a suit 200 wherein the yoke 202 has been connected to the seal ring assembly 205. As previously noted, a pair of safety latch tabs 218 extend from the clamp ring 220 and are adapted to engage the pair of safety latches 110. Likewise, a retainer 216 extends from the rear of the clamp ring 220 and is adapted to receive the clamp ring tab 108. The seal ring 208 is affixed to the clamp ring 220 and its outer edge defines the o-ring gland 210. The seal ring assembly 205 is adapted to receive and mate with the bottom 12 of the helmet 8. FIGS. 15-16 illustrate a worker fully encapsulated in the helmet and suit apparatus 5.

In operation, a worker can affix a hard hat to the attachment points 32 if needed. The worker may also attach various accessories to the accessory rails 42, and non-limiting examples of the accessories include: lighting systems for low light conditions, camera systems for monitoring and/or recording, backup lighting, thermal cameras, laser pointing devices, gaseous detection devices, and other job specific equipment known to one of ordinary skill in the art. In some embodiments, the worker can attach an air hose to the inlet port 65 which is connected to a compressor. If needed, the worker can secure the various hoses and wires to the strain relief clamp 28. Next, the worker enters the suit 200 from a zipper in the back of the suit and places their head through the yoke 202 and seal ring assembly 205. The helmet 8 is then donned by aligning the clamp ring tab 108 with the retainer 216, and the retainer assembly 215 guides the helmet 8 in place. If a chin strap is affixed to the chin strap attachment points 35, the user can buckle the chin strap. Next, the user snaps the clamp ring tab 108 in place to the retainer 216 and secures the pair of safety latches 110 to the safety latch tabs 218 of the seal ring assembly 205. If a lanyard or other cord is connected to the lanyard attachment point 225, the worker can also utilize the lanyard for donning and doffing. Once the helmet 8 is connected to the seal ring assembly 205, and the clamp ring tab 108 and safety latches 110 are in place, the helmet and suit apparatus 5 is ready for operation. Once the task is complete, the worker simply removes the safety latches 110 and the clamp ring tab 108 from the seal ring assembly 205, and removes the helmet 8.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways.

Also, it is to be understood that words and phrases used herein are for the purpose of description and should not be regarded as limiting. The use herein of "including," "comprising," "e.g.," "containing," or "having" and variations of those words is meant to encompass the items listed thereafter, and equivalents of those, as well as additional items.

Accordingly, the foregoing descriptions of several embodiments and alternatives are meant to illustrate, rather than to serve as limits on the scope of what has been disclosed herein. The descriptions herein are not intended to be exhaustive, nor are they meant to limit the understanding of the embodiments to the precise forms disclosed. It will be understood by those having ordinary skill in the art that modifications and variations of these embodiments are reasonably possible in light of the above teachings and descriptions.

What is claimed is:

1. A helmet apparatus adapted to be worn over the head of a wearer, comprising:
   a helmet having an outside surface, an inside surface, a front, a back, a pair of sides, a top, and a bottom;
   a lens mounted to the front of the helmet;
   an air control system permitting air flow into and out of the helmet; and
   a seal ring assembly adapted to receive and mate with the bottom of the helmet;
   wherein a plurality of accessory rails are mounted to the outside surface of the helmet, wherein each of said accessory rails run from the front to the back of the helmet; and
   wherein a top surface of said helmet defines a rail protrusion which receives one of the accessory rails and defines a handle opening positioned between said top surface of the helmet and said accessory rail.

2. The helmet apparatus of claim 1, wherein the air control system comprises an air inlet mounted to the outside surface of the helmet and permitting air flow into the air control system, a series of passages connected to both the air inlet and a plurality of ports positioned throughout the inside surface of the helmet permitting air flow into the helmet, and an air exhaust valve mounted to the outside surface of the helmet and permitting air flow out of the helmet.

3. The helmet apparatus of claim 2, wherein the air inlet defines an inlet port facing towards the rear of the helmet and being adapted to receive an air hose; and
   wherein said inlet port further comprises a first component integrally connected to a second component at about a ninety degree angle, wherein the second component is connected to the series of passages of the air control system.

4. The helmet apparatus of claim 2, wherein the plurality of ports comprise a plurality of head ports permitting air flow to the wearer's head and a plurality of lens ports permitting air flow to an inside surface of the lens.

5. The helmet apparatus of claim 2, wherein the air exhaust valve defines an exit channel through which air exits the inside surface of the helmet;
   the air exhaust valve further comprising an umbrella valve fitted into said exit channel and permitting air flow only out of said helmet, a pressure plate, and a spring engaged to the umbrella valve, said pressure plate and spring providing a force that opposes the opening of said umbrella valve.

6. The helmet apparatus of claim 5, wherein the air exhaust valve further comprises an exhaust cover placed over the umbrella valve, the pressure plate and the spring;
   wherein said exhaust cover having a labyrinth exhaust which defines a series of hollow portions having right angles to permit passage of air flow through said exhaust valve.

7. The helmet apparatus of claim 2, wherein the front of the helmet further comprises a bezel which defines a lens opening and being adapted to receive the lens; and
   wherein the lens is positioned at an upwards angle when received in the bezel.

8. The helmet apparatus of claim 7, wherein the lens comprises a pair of opposing sides and a pair of opposing lengths, wherein the lens curves backwards towards the rear of the helmet.

9. The helmet apparatus of claim 8, wherein the air inlet is mounted to one of the sides of the helmet and the air exhaust valve is mounted to the opposing side of the helmet, wherein the air inlet is positioned adjacent to and behind one of the opposing sides of the lens and the air exhaust valve is positioned adjacent to and behind the other opposing side of the lens.

10. The helmet apparatus of claim 1, wherein the seal ring assembly comprises a clamp ring and a seal ring, wherein said seal ring comprises a top surface being adapted to receive the bottom of said helmet and a bottom surface being adapted to receive and engage a top surface of said clamp ring.

11. The helmet apparatus of claim 10, wherein the seal ring assembly is adapted to receive and secure a top portion of a garment between said seal ring and said clamp ring.

12. The helmet apparatus of claim 11, wherein the garment is chosen from the group consisting of a yoke or a neck dam.

13. A helmet and suit apparatus, comprising the helmet apparatus of claim 11, wherein the garment comprises a yoke integrally connected to a suit adapted to be worn over the body of the wearer, wherein the helmet and suit apparatus fully encapsulate the wearer when said helmet and said yoke are secured to the seal ring assembly.

14. The helmet apparatus of claim 10, wherein said seal ring assembly further comprises a pair of safety latches adjustably connected to the bottom of said helmet, and a retainer assembly connected to the bottom and back of said helmet.

15. The helmet apparatus of claim 1, further comprising a strain relief clamp mounted to the outside surface and adjacent the back of the helmet, said strain relief clamp being adapted to receive and secure a plurality of cables.

16. A helmet apparatus adapted to be worn over the head of a wearer, comprising:
   a helmet having an outside surface, an inside surface, a front, a back, a pair of sides, a top, and a bottom;
   a lens mounted to the front of the helmet;
   an air control system permitting air flow into and out of the helmet; and
   a seal ring assembly adapted to receive and mate with the bottom of the helmet;
   wherein the air control system comprises an air inlet mounted to the outside surface of the helmet and permitting air flow into the air control system, a series of passages connected to both the air inlet and a plurality of ports positioned throughout the inside surface of the helmet permitting air flow into the helmet, and an air exhaust valve mounted to the outside surface of the helmet and permitting air flow out of the helmet;
   wherein the air inlet defines an inlet port facing towards the rear of the helmet and being adapted to receive an air hose; and
   wherein said inlet port further comprises a first component integrally connected to a second component at about a ninety degree angle, wherein the second component is connected to the series of passages of the air control system.

17. A helmet apparatus adapted to be worn over the head of a wearer, comprising:
   a helmet having an outside surface, an inside surface, a front, a back, a pair of sides, a top, and a bottom;
   a lens mounted to the front of the helmet;
   an air control system permitting air flow into and out of the helmet; and a seal ring assembly adapted to receive and mate with the bottom of the helmet;

wherein the seal ring assembly comprises a clamp ring and a seal ring, wherein said seal ring comprises a top surface being adapted to receive the bottom of said helmet and a bottom surface being adapted to receive and engage a top surface of said clamp ring;

wherein said seal ring assembly further comprises a pair of safety latches adjustably connected to the bottom of said helmet, and a retainer assembly connected to the bottom and back of said helmet;

wherein said clamp ring defines a pair of safety latch tabs extending outward from said clamp ring and being adapted to receive the pair of safety latches;

wherein a front portion of the clamp ring further defines a lanyard attachment point being adapted to receive a cord; and wherein said retainer assembly comprises a clamp ring tab adjustably connected to the bottom and back of said helmet, and a retainer extending from a rear surface of said clamp ring and being adapted to receive said clamp ring tab.

18. A helmet apparatus adapted to be worn over the head of a wearer, comprising:

a helmet having an outside surface, an inside surface, a front, a back, a pair of sides, a top, and a bottom; wherein the inside surface of the helmet is adapted to receive a hard hat worn over the head of the wearer;

a lens mounted to the front of the helmet;

an air control system permitting air flow into and out of the helmet; and a seal ring assembly adapted to receive and mate with the bottom of the helmet;

wherein a plurality of attachment points are mounted to the inside surface of the helmet and said attachment points are adapted to receive the hard hat; wherein the hard hat is positioned internal to the outside surface of said helmet; and wherein the inside surface of the helmet defines a pair of chin strap attachment points being adapted to receive a chin strap.

* * * * *